US011911803B2

(12) United States Patent
Harris et al.

(10) Patent No.: US 11,911,803 B2
(45) Date of Patent: Feb. 27, 2024

(54) AUTOMATED SORTING AND PACKING SYSTEM

(71) Applicant: Staples, Inc., Framingham, MA (US)

(72) Inventors: Calem Harris, Tampa, FL (US); Sebastian Mora, Davenport, FL (US); Grant Tucker, Orlando, FL (US); Arun Kumar Ranganathan Jagannathan, Shrewsbury, MA (US); Carl Skantze, Tampa, FL (US); Arnold Tsoka, Orlando, FL (US); Mario Faulkner, Wesley Chapel, FL (US)

(73) Assignee: Staples, Inc., Framingham, MA (US)

( * ) Notice: Subject to any disclaimer, the term of this patent is extended or adjusted under 35 U.S.C. 154(b) by 0 days.

(21) Appl. No.: 17/661,702

(22) Filed: May 2, 2022

(65) Prior Publication Data

US 2023/0347386 A1 Nov. 2, 2023

(51) Int. Cl.
*B07C 5/36* (2006.01)
*B07C 5/10* (2006.01)

(52) U.S. Cl.
CPC ................ *B07C 5/362* (2013.01); *B07C 5/10* (2013.01); *B07C 2501/0063* (2013.01)

(58) Field of Classification Search
CPC .............. B07C 3/008; B07C 3/06; B07C 3/08
USPC .......................................................... 209/522
See application file for complete search history.

(56) References Cited

U.S. PATENT DOCUMENTS 3,071,239 A * 1/1963 Burtness ................ B65G 47/82 198/370.07
4,058,199 A 11/1977 Schlagel
6,460,681 B1 * 10/2002 Coutant ............... B65G 47/965 209/912

(Continued)

FOREIGN PATENT DOCUMENTS

AU 2009238310 A1 6/2010
CN 212103473 U 12/2020
CN 112024419 B 4/2022

OTHER PUBLICATIONS

Xu; Qiang, "Automatic opening and closing door discharging device" (English Translation), Dec. 8, 2020, worldwide.epacenet.com (Year: 2020).

(Continued)

*Primary Examiner* — Michael McCullough
*Assistant Examiner* — Molly K Devine
(74) *Attorney, Agent, or Firm* — VLP Law Group LLP; Michel Bohn

(57) ABSTRACT

An automated sorting and packing system is described. In an example implementation, the system may include a transfer station that transfers an item into a shipping carton, one or more conveyors that convey the item and/or carton to a transfer station, a scanner that scans the item, and a processor communicatively coupled with the scanner and the one or more conveyors. According to some implementations, the system may perform operations including determining a carton identifier associated with a carton based on an order, assigning a transfer station to the order and the carton identifier based on scan data identifying an item, transporting the item to the transfer station using a conveyor, and transferring the item from the conveyor to a carton associated with the carton identifier using the transfer station.

21 Claims, 21 Drawing Sheets

(56) References Cited

U.S. PATENT DOCUMENTS

| | | | | |
|---|---|---|---|---|
| 6,688,459 | B1 * | 2/2004 | Bonham | B65G 47/82 209/916 |
| 6,695,135 | B1 | 2/2004 | Lapeyre | |
| 7,650,985 | B2 | 1/2010 | Day | |
| 9,192,965 | B2 * | 11/2015 | Serjeantson | B07C 3/06 |
| 10,646,991 | B2 * | 5/2020 | Wagner | B65G 1/1371 |
| 10,981,732 | B2 | 4/2021 | Eisenberg et al. | |
| 11,208,272 | B2 * | 12/2021 | Battles | G06Q 50/28 |
| 2020/0024014 | A1 | 1/2020 | Warmulla | |

OTHER PUBLICATIONS

Zhang; Hongqing "Crossed Belt Type Sorting System and Sorting System" (English Translation), Dec. 4, 2020, worldwide.epacenet.com (Year: 2020).

* cited by examiner 482a
480
482b
450

AUTOMATED SORTING AND PACKING SYSTEM

BACKGROUND

This application relates to warehouse fulfillment systems. For example, this application relates to an automated system for sorting and packing items.

Some current fulfillment systems use drag-along carts onto which items are placed by pickers. The pickers may place the items into shipping cartons to be shipped to customers. Other fulfillment systems may use robots to bring items to pickers, who then manually place the items into shipping cartons. Some fulfillment systems divide inventory into a series of zones and use carts, robots, or conveyor belts to move items between zones, but many of the operations are performed manually. Such manual processes require human pickers to follow many instructions, which leads to significant errors by the human pickers and fatigue.

SUMMARY

An automated sorting and packing system can be configured to perform particular operations or actions by virtue of having software, firmware, hardware, or a combination of them installed on the system that in operation causes or cause the system to perform the actions. One general aspect of the system includes a transfer station that transfers an item into a shipping carton; one or more first conveyors that convey the item between an item induction point and the transfer station; one or more second conveyors that convey the shipping carton between a carton induction point and the transfer station; one or more scanners that scan the item; and one or more processors communicatively coupled with the one or more scanners, the one or more first conveyors, and the one or more second conveyors to perform operations.

Implementations of the system may include one or more of the following features. The system further including: a plurality of transfer stations located along a length of the one or more first conveyors and the one or more second conveyors; that the one or more first conveyors pass through a scan tunnel in advance of the transfer station along a direction of movement of the one or more first conveyors, the one or more scanners pointing toward the item on the one or more first conveyors when the one or more scanners are housed in the scan tunnel; that the transfer station includes a consolidation area proximate to the one or more first conveyors and a carton-receiving area proximate to the one or more second conveyors; and that the first transfer station includes a door at the consolidation area and coupled with an electrical actuator (e.g., a rotary motor, linear actuator, etc.), the electrical actuator retaining the door in a closed position when the item is in the consolidation area and opening the door in response to a signal from the one or more processors; the transfer station includes a guide member adapted to guide the item into the shipping carton during transfer of the item into the shipping carton, the door allowing the item to pass from the consolidation area into the shipping carton when the door is in an open position; and the consolidation area is located at a higher elevation than the carton-receiving area.

Implementations of the system may include one or more of the following features. That the one or more second conveyors pass partially underneath and parallel with the one or more first conveyors at a point where the one or more first conveyors are proximate to the transfer station; a diverter mechanism adapted to transfer the item from the one or more first conveyors to a consolidation area of the transfer station, the diverter mechanism including a conveyor belt and a surface coupled to the conveyor belt, the conveyor belt translating the surface perpendicular to a direction of movement of the one or more first conveyors, the surface adapted to contact the item on the one or more first conveyors and move the item into the transfer station; and that the one or more second conveyors convey the shipping carton with the item inside of the shipping carton from the transfer station to a finalizing area.

Another general aspect includes a method including: determining a first carton identifier associated with a first carton for a first order; assigning a first transfer station to the first order and the first carton identifier based on scan data identifying a first item; transporting the first item to the first transfer station using one or more first conveyors; and transferring the first item from the one or more first conveyors to a first carton associated with the first carton identifier using the first transfer station.

Implementations of the operations may include one or more of the following features. Transporting the first carton associated with the first carton identifier to the first transfer station assigned to the first order using one or more second conveyors, the first carton being a shipping carton; responsive to determining that a defined condition has been satisfied, transporting, by the one or more processors, the first carton to a finalizing area using the one or more second conveyors, the defined condition including that the first item has been transferred into the first carton using the first transfer station; receiving scan data identifying the first item on one or more first conveyors; determining the first order associated with the first item based on the scan data identifying the first item; and assigning, by the one or more processors, the first transfer station to the first order and the first carton identifier based on the scan data identifying the first item.

Implementations of the operations may include one or more of the following features. Selecting a carton size of the first carton based on the first order, associating, in memory accessible to the one or more processors, the first carton identifier to the first carton with the first order, identifying the first carton having the selected carton size based on the first carton identifier; automatically transporting the first carton from a case erector to a carton-receiving area of the first transfer station via one or more second conveyors based on the first carton identifier, the one or more second conveyors being located partially underneath the one or more first conveyors, the carton-receiving area being located below a transfer station consolidation area that receives one or more items; aligning the first carton to an edge under a door in the carton-receiving area of the first transfer station; and automatically transporting the first carton from the carton-receiving area of the first transfer station to a finalizing area via the one or more second conveyors based on a defined condition, the defined condition including that the first item has been transferred into the first carton via the first transfer station.

Implementations of the operations may include one or more of the following features. Receiving scan data identifying a batch container containing a plurality of items; identifying a plurality of orders associated with the plurality of items based on the scan data identifying the batch container, the plurality of orders including the first order and the plurality of items including the first item; providing an instruction to one or more computing devices indicating to place the plurality of items on the one or more first conveyors; assigning a plurality of transfer stations to the plurality of orders; transporting a plurality of cartons to the plurality of transfer stations using one or more second conveyors responsive to receiving the scan data identifying the batch container and based on the respective assigned transfer station for each of the plurality of orders, the plurality of cartons including the first carton.

Implementations of the operations may include one or more of the following features. Determining that the first item is at a loading point on the one or more first conveyors for the first transfer station; responsive to determining that the first item is at the loading point, diverting, by the one or more processors, the first item into a consolidation area of the first transfer station; determining that a set of items assigned to the first carton are in the consolidation area of the first transfer station; responsive to determining that all items assigned to the first carton are in the consolidation area of the first transfer station, transferring the set of items from the consolidation area into the first carton using the first transfer station; that transferring the items from the consolidation area into the first carton using the first transfer station includes opening a door of the first transfer station to allow the items to drop from the consolidation area into the first carton; determining that the first item has been transferred to the first carton using the first transfer station; determining an availability for the first carton on one or more second conveyors; transferring the first carton from the first transfer station to the one or more second conveyors at the availability for the first carton on the one or more second conveyors; and transporting the first carton to a finalizing area using the one or more second conveyors.

Other implementations of one or more of these aspects include corresponding systems, apparatus, and computer programs, configured to perform the actions of the methods, encoded on computer storage devices.

It should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

DESCRIPTION

Figure 1:
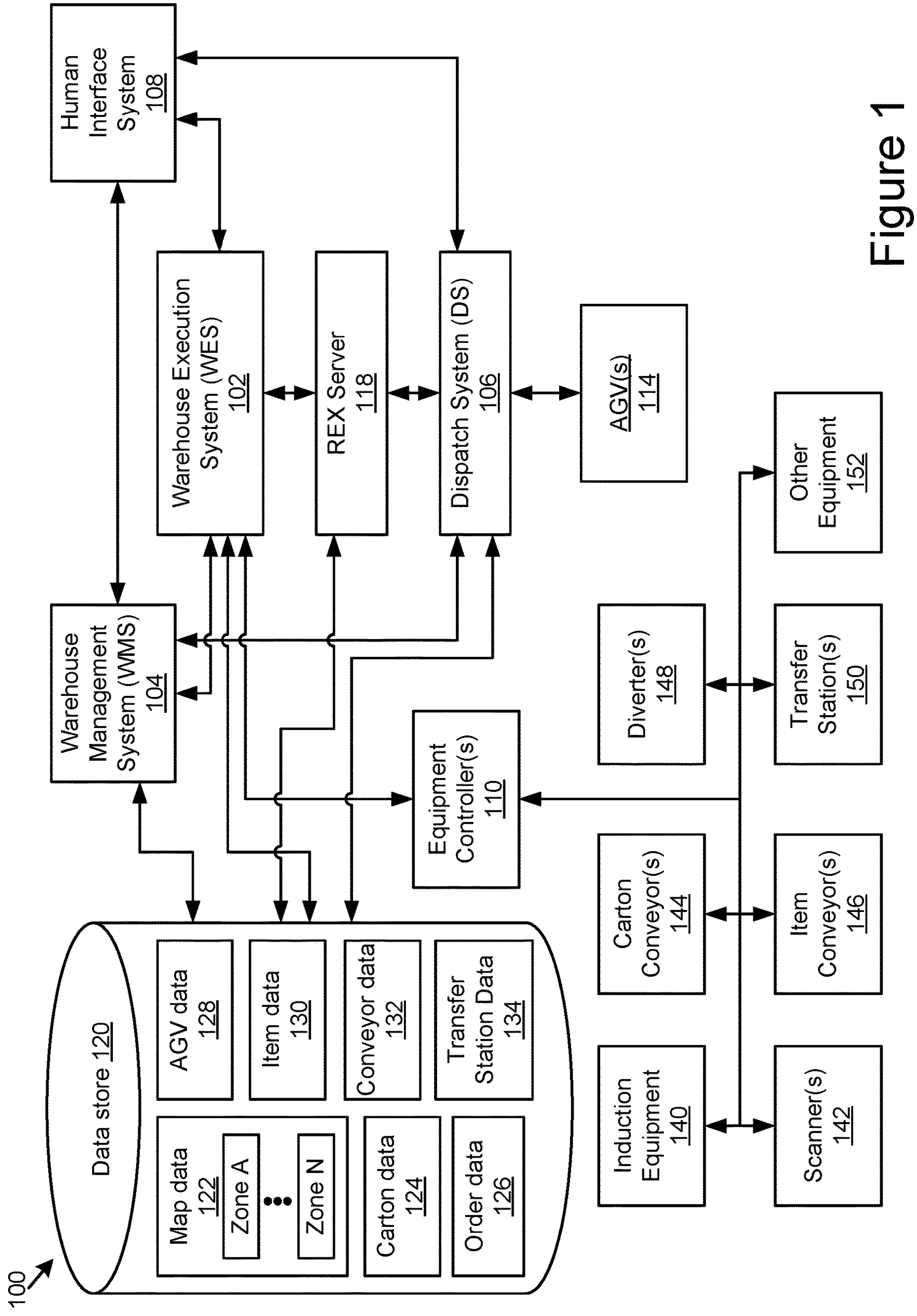
FIG. 1 depicts an example system and data communication flow for implementing an automated sorting and packing system.

The technology described herein relates to an automated sorting and/or packing system comprising various software and hardware devices. The technology may include beneficial configurations, operations, features, and interactions. Among other benefits, the technology described herein improves upon that described in the Background Section. For instance, the technology provides robotic devices, systems, methods, and other aspects that can more efficiently process goods (e.g., items or items in a distribution facility).

Features of the technology described herein can be integrated into any logistics system, dispatch system, warehouse execution system, warehouse management system, a robot execution server, etc., to coordinate the operations of various systems, information, and devices in an automated sorting and packing system. The technology described herein may provide a fully or partially automated system that provides redundancy, reduces number of operations (e.g., by eliminating steps, avoiding transferring items between excess numbers of containers, etc.), and provides many other benefits described herein. The technology beneficially improves productivity and throughput, increases asset utilization, and lowers cycle time and labor costs. These benefits, in turn, lead to shorter delivery times and result in significant time and resource savings along with reduced error rates.

In some implementations, the technology may include a unit sorter that sorts individual items into their respective orders. For example, an operator or robotic device may place an item onto a sorter and a control system may direct the sorter to convey the item through a scanner that scans identifying traits of the item. The scanner of the sorter may communicate the item-identifying information to the control system, which identifies an order to which the identifying information belongs. The control system may drive the item forward until it arrives at an assigned location associated with the order in the sorter. The control system may actuate a diverter mechanism that pushes the item into the assigned location, such as a chute. In some instances, when the sorter has sorted the items associated with the order to the assigned location, it may move the item(s) to a secondary location. For instance, the control system may open a consolidation tray and drop the items into a shipping carton for the order. The sorter may then actuate a motor to divert the shipping carton onto a take-away conveyor line where the carton may be scanned, and a corresponding shipping label be applied to the carton in association with the order. It should be noted that these operations are provided as an illustrative example and many other operations and features are within the scope of the present disclosure.

The technology may allow the automated sorting and packing system to induct cartons in association with determined orders and, potentially, transfer items directly into the cartons. For instance, as the control system scans SKUs (stock keeping units, which may identify individual physical items) for a given order, it may control the interaction between various software and hardware systems to coordinate operations. For example, the control system may determine a size of carton, box, or other container that pertains to a specific order, which the system may induct in parallel with a scanned item and, depending on the implementation, transfer the item directly into the carton.

The technology may, based on an identification of an item and order, automate numerous operations, such as the coordinated pairing of otherwise un-associated systems thereby providing the noted benefits, among others. The system may include various levels of control, for example, by providing system-level and/or device-level identification of items, label application, item-to-carton matching, item-to-order matching, etc. For example, an individual item may be identified, matched to an order, matched to a carton, and matched to sorting or transfer equipment.

With reference to the figures, reference numbers may be used to refer to components found in any of the figures, regardless of whether those reference numbers are shown in the figure being described. Further, where a reference number includes a letter referring to one of multiple similar components (e.g., component 000a, 000b, and 000n), the reference number may be used without the letter to refer to one or all of the similar components.

FIG. 1 depicts an example system 100 and data communication flow for implementing an automated sorting and packing system. The system 100 includes a warehouse execution system (WES) 102. The WES 102 is coupled to equipment controller(s) 110, a warehouse management system (WMS) 104, a data store 120 storing various data, a human interface system 108 (e.g., pick-to-voice, pick-to-light, graphical user interface(s), etc.), a robot execution server (REX) 118, a dispatch system 106, and other systems. For instance, the system 100 may include induction equipment 140, scanner(s) 142, carton conveyor(s) 144, item conveyor(s) 146, diverter(s) 148, transfer station(s) 150, and other equipment 152.

The WES 102 may, in some implementations, include one or more hardware and/or virtual servers programmed to perform the operations, acts, and/or functionality described herein. The components of the WES 102 may comprise software routines storable in one or more non-transitory memory devices and executable by one or more computer processors of the WES 102 to carry out the operations, acts, and/or functionality described herein. In further implementations, these routines, or a portion thereof, may be embodied in electrical hardware that is operable to carry out the operations, acts, and/or functionality described herein.

For example, the WES 102 may be communicatively coupled with scanner(s) 142, carton conveyor(s) 144, item conveyor(s) 146, diverter(s) 148, and other equipment 152 either directly or via the equipment controller(s) 110, which may be programmable logic controllers (e.g., conveyor controllers, conveyor scanner controllers, automated induction equipment controllers, other warehouse equipment controllers, or other computing devices for controlling equipment).

In some implementations, the WES 102 may receive, process, and transmit data to control software and hardware interactions, for example, by consolidating and controlling information across systems, as described herein. For instance, the WES 102 may serve as a decision point or control software that processes data streams for transfer station 150 allocation, item sorting, box induction, and other computations, as noted herein. For example, the WES 102 may communicate with equipment controller(s) 110 and/or other systems to induct a box, apply a tracking label (e.g., the identification code or license plate number described herein) to the box, and convey the box to an assigned location. The WES 102 may divert items and/or boxes into transfer stations 150, initiate the transfer of items into the boxes, and/or control finalizing of the cartons and order. One or more of these operations may be performed via communication with various equipment of the system 100, as described in further detail herein. Accordingly, the WES 102 may provide unified communication that coordinates various systems.

The WES 102 may communicate with various other systems and devices to perform its operations, as described herein, such as equipment controller(s) 110, induction equipment 140, scanner(s) 142, carton conveyor(s) 144, item conveyor(s) 146, diverter(s) 148, transfer station(s) 150, and other equipment 152. Induction equipment 140 may include an induction station (e.g., where items are placed on an item conveyor 146, such as an induction belt), box erectors, label applicators, scanners 142, picking equipment, or other devices for inducting items or cartons into the sorting system. Scanners 142 may include optical, radio, or other scanners or sensors that scan items or cartons to identify items, cartons, or other objects. Carton conveyors 144 may include one or more conveyors, such as conveyor belts or other devices that convey objects, such as shipping cartons, for example, between a carton induction point, transfer station 150, and/or end points (e.g., finalizing). Item conveyors 146 may include one or more conveyors, such as conveyor belts or other devices that convey objects, such as items or products, for example, between an item induction point, scan tunnel 250, transfer station 150, and/or end points (e.g., finalizing, item jackpot, etc.). While the carton conveyors 144 and item conveyors 146 may be different conveyors and/or types of conveyors, in some implementations, they may be the same conveyors and/or conveyor types. Diverters 148 may be divert arms, diverter mechanisms, such as those described herein, pneumatic mechanisms, or other devices for diverting items and/or cartons for moving the items or cartons, for example, from conveyors into transfer stations 150. Transfer stations 150 may be devices for transferring items into cartons, for example, for example, transfer stations 150 may be located adjacent to item and/or carton conveyors 144. Other equipment 152 may include various other devices, such as label applicators, carton-closing equipment, control systems, printers, actuators, motors, etc. The devices 140-152 are described in further detail throughout this disclosure.

The REX 118 may, in some implementations, include one or more hardware and/or virtual servers programmed to perform operations, acts, and/or functionality described herein. The REX 118 may generate a schedule that defines the route for an AGV 114 during a picking session. For a given AGV 114, depending on the items (e.g., identified by stock keeping units or SKUs) to be placed in the cartons of a cart, the REX 118 may generate an AGV 114 schedule and transmit it to the dispatch system 106, which in turn deploys an AGV 114 according to the schedule, for instance. In some implementations, the dispatch system 106 instructs the AGV 114 to proceed through one or more of the zones of the distribution facility according to the schedule. The schedule of each of the AGVs 114 may be coordinated such that an optimal flow can be achieved, as discussed elsewhere herein.

In some implementations, the REX 118 may include or may communicate with a SKU (e.g., a stock keeping unit or unique identifier identifying an item) routing engine, which may route items into different storage zones depending based on picking profiles of the items, which may be stored and maintained as item data 130. The SKU routing engine may dynamically monitor picking activity in the distribution facility, track which items have the highest volume or velocity for a given timeframe, store the tracking data in the data store 120, and instruct the REX 118 to have items relocated by AGVs to different locations in the distribution facility based on the tracked activity.

The dispatch system 106 may be electronically communicatively coupled to a plurality of automated guided vehicles (AGVs) 114. In some implementations, the dispatch system 106, or elements thereof, may be integrated with or communicatively coupled with the REX 118. The dispatch system 106 includes hardware and software configured to dispatch the AGVs and is coupled for communication the components of the system 100 to receive instructions and provide data. The dispatch system 106 may calculate a route to execute the task considering traffic and resources. In some cases, it adjusts the route or the task in order to make the route efficient.

The AGVs 114 are robotic vehicles including drive units providing motive force for moving the AGVs (and, in some instances, carts, storage units, etc.), guidance systems for determining position of the AGVs 114 within the distribution facility, and equipment for carrying items. Some AGVs 114 may be attached to, include, or carry carts, which, in turn, carry items.

The WMS 104 may, in some implementations, include one or more hardware and/or virtual servers or software routines storable in one or more non-transitory memory devices and executable by one or more processors to perform the operations, acts, and/or functionality described herein. The WMS 104 may be configured to store and maintain data in the data store 120. In some implementations, the WMS 104 may be configured to communicate with the WES 102, the human interface system 108, dispatch system 106 and/or other systems in real time, in batches, as requested by these components, etc. For example, the WMS 104 may receive order data from an e-commerce or other server, process the data, and update various data in the data store 120 based on the order data. Similarly, the WMS 104 may detect and update inventory and other data.

The human interface system 108 may, in some implementations, include one or more hardware and/or virtual servers or software routines storable in one or more non-transitory memory devices and executable by one or more processors to perform operations, acts, and/or functionality described herein. The human interface system 108 may provide instructions and/or receive pick confirmations, for example, from pickers or operators (e.g., using barcode scanners, NFC, RFID or radio-frequency identification chips, or other sensors or input methods) working within a pick zone confirming that picks for a given carton have been performed, as described in further detail below. An example human interface system 108 may include a pick-to-voice, pick-to-light, or graphical user interface system. The human interface system 108 may be configured to communicate the pick confirmation data with the WES 102, WMS 104, or other components of the system in real time, in batches, as requested by the components of the system, etc.

The human interface system 108 may receive confirmatory input (e.g., pick confirmations) from pickers working within a pick zone. The confirmatory input confirms that all picks for a given carton have been completed. The human interface system 108 transmits the confirmatory input to the WES 102. The confirmatory input may include the time stamp reflecting completion of the operations, a unique identifier identifying the picker (e.g., an operator or human agent), a unique identifier identifying the pick zone, a unique identifier identifying the AGV, and/or a unique identifier identifying the carton.

The data store 120 is an information source for storing and providing access to data. The data stored by the data store 120 may be organized and queried using various criteria including any type of data stored by it. The data store 120 may include data tables, databases, or other organized collections of data. An example of the types of data stored by the data store 120 may include, but is not limited to map data 122, carton data 124, order data 126, AGV data 128, item data 130, conveyor data 132, transfer station data 134, etc. In some instances, the data store 120 may also include conveying system attributes, picking data, agent attributes, sensor data, etc.

The data store 120 may be included in the WES 102, WMS 104, REX 118, or in another computing system and/or storage system distinct from but coupled to or accessible by the WES 102, WMS 104, REX 118, or other components of the system 100. The WES 102, human interface system 108, REX 118, and/or dispatch system 106, for example, may store and maintain data in the data store 120. The data store 120 can include one or more non-transitory computer-readable mediums for storing the data. In some implementations, the data store 120 may store data associated with a database management system (DBMS) operable on a computing system. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

The map data 122 may include data reflecting the 2- or 3-dimensional layout of the facility including the location of storage units, picking areas, lanes, equipment, storage shelving units, items, AGVs 114, conveyors, transfer stations 150, etc. Map data 122 may indicate the attributes of the distribution facility, including attributes of zones of a warehouse. For example, attributes of zones may include the number, quantity, and location of shelving units or bays, storage units, items, guidance system locators or markers, etc.

The carton data 124 may include information about cartons and/or containers in the system, such as a unique identifier or license plate number for each carton or container, a carton or container type, the zones a carton will visit, the number of pick lines a carton proceeds through, and the priority for the carton. The carton data 124 may include a picklist defining the items the carton will contain. The carton data 124 may include size or configuration of a carton, associated transfer station 150, or other details.

The order data 126 includes data about orders, items picked, items to be picked, picking performance, confirmations, locations of items, etc. Order data 126 may indicate the quantity and identity of items in orders, shipping addresses, order priority, progress of order fulfillment, number of cartons in an order, sub-orders when and order is split into multiple cartons, etc.

The AGV data 128 may describe the state of an AGV (operational state, health, location, battery life, storage capacity, items being carried, cartons, etc.), whether picker assigned to it, etc.

The item data 130 may describe items in a distribution facility. The item data 130 may include unique identifiers for these items, the item volume (e.g., the total amount picked in given window (e.g., in an hour, day, etc.)), the item velocity (e.g., number of different times item picked in given window (e.g., per hour, day etc.), the location of the items within the distribution facility (aisle, shelf, shelf position, etc.), other attributes of the item (e.g., size, description, weight, quantity of items in a package, color, etc.), item inventory, or mapping of items to storage units, orders, conveyor locations, transfer stations 150, etc. In some implementations, the item data 130 may include the quantity of particular items a storage unit contains, the current location of a storage unit, a storage location of items and/or storage units, and other data. For instance, the item data 130 may include visual aspects, labels, QR codes, identifying markers, etc., that may be used by the WES 104 or equipment controller(s) 110 to identify items, for example, based on a scan of an item.

The conveyor data 132 may include various data pertaining to the conveyors 144 and 146, for example. For example, the conveyor data 132 may describe the state of a conveyor 144 or 146, such as the location, speed, operational state, health, capacity, attributes, items being carried, cartons, or other data.

The transfer station data 134 may include various data pertaining to the transfer station(s) 150, such as the state of each transfer station 150, such as its location, speed, operational state, health, capacity, attributes, item(s) in or assigned to the transfer station 150, order(s) assigned to the transfer station 150, cartons in or assigned to the transfer station 150, or other data.

The components of the system 100 may be coupled to exchange data via wireless and/or wired data connections. The connections may be made via direct data connections and/or a computer network. The computer network may comprise any number of networks and/or types of networks, such as wide area networks, local area networks, virtual private networks, cellular networks, close or micro proximity networks (e.g., Bluetooth, NFC, etc.), etc. In some implementations, one or more of these components may be coupled via a data communications bus.

Figure 2:
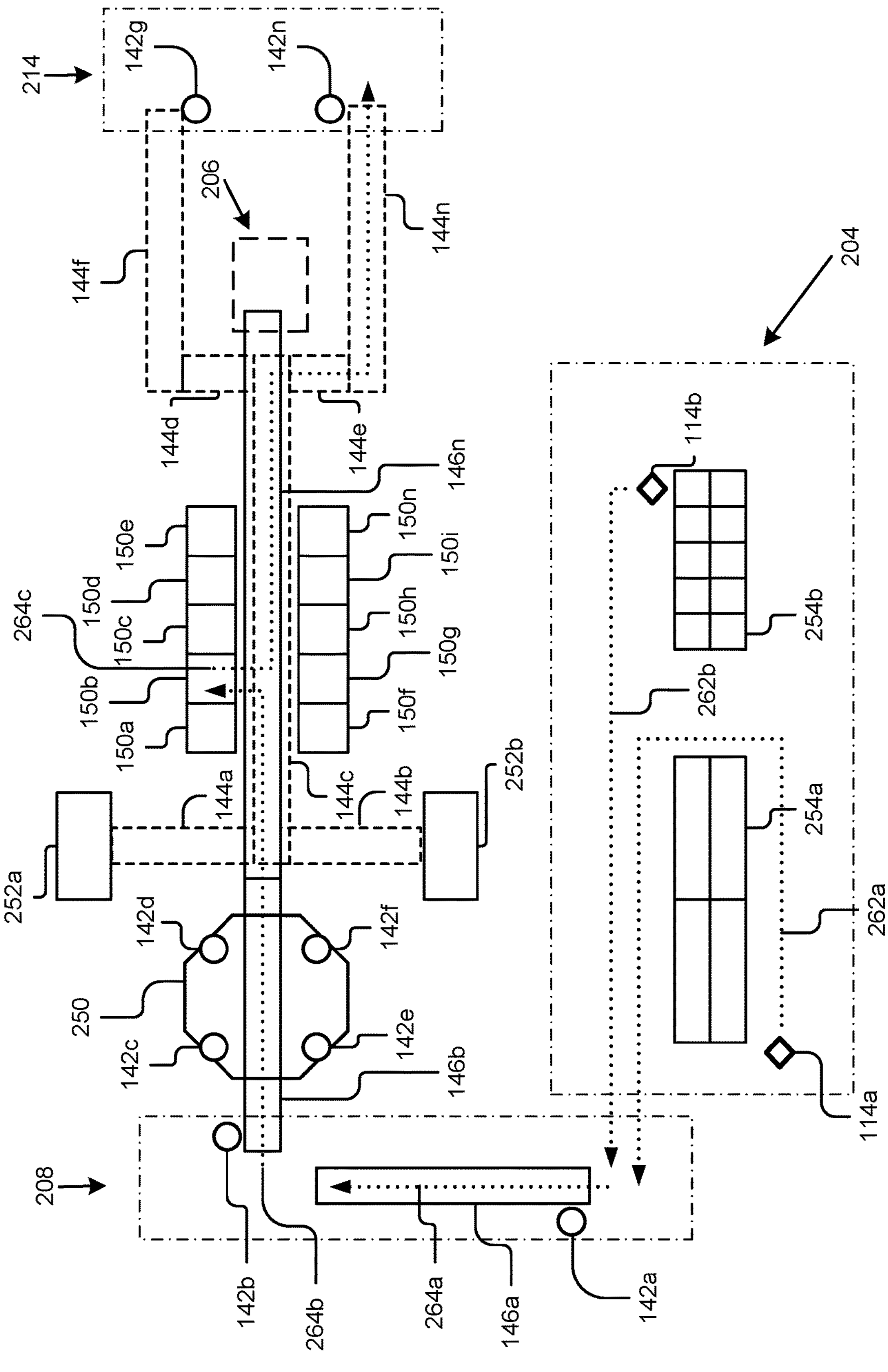
FIG. 2 depicts a schematic of an example configuration of a distribution facility, which may be an operating environment of the automated packing and sorting system.

FIG. 2 depicts a schematic of an example configuration of a distribution facility, which may be an operating environment of the automated packing and sorting system. It should be understood that various distribution facilities may include different configurations. For instance, the facility may have different zones or devices, different configurations, layouts, etc. The layout depicted in FIG. 2 includes various areas, such as an induction area 208, a storage area 204, and a finalizing area 214, for example, in addition to other equipment 152 described herein. In some cases, the layout may include multiple levels of mezzanine with one or more of the different zones/areas. The layout may also include a replenishment area in which storage units are replenished with items.

The storage area 204 may include various shelves 254*a* and 254*b*, which may store items or other objects. For example, the shelves 254*a* may be divided into bays from which items may be picked by human or robotic pickers. For instance, human pickers may take items from the shelves 254*a* and place them into a tote or container, such as the batch container described herein. In some instances, the REX 118 may instruct an AGV 114*a* to autonomously visit (e.g., following the example path 262*a*) the shelves 254*a* where items are placed into batch containers and then transported, by the AGV 114*a* to an induction area 208, for example, to a conveyor 146*a*, induction station, or induction point. For instance, the human interface system 108 may instruct a picker to place items from the shelves 254*a* into batch containers, from the batch conveyors onto item conveyors 146, or other operations, as described elsewhere herein.

The storage area 204 may additionally or alternatively include shelves 254*b* from which a second AGV 114*b* may retrieve containers of items, for example, batch or other containers. The REX 118 may instruct the second AGV 114*b* to transport (e.g., following example path 262*b*) the container to an induction area 208, for example, to a conveyor 146*a*, induction station, or induction point. The AGVs 114*a* and 114*b* may include guidance systems using guidance system locators or markers, such as guide tape, laser targets, vision guidance, etc.

The induction area 208 may include various induction equipment 140 or induction stations where items may be inducted into the sorting system, for example, onto the item cartons. In some implementations, the induction area 208 may include a scanner 142*a*, for example, at the beginning or end of a conveyor 146*a* or at an induction point, which may scan batch containers and/or items to identify the containers or items. For instance, an AGV 114*a* or picker may place a batch container of items onto a conveyor 146*a*, which transports the batch container to an induction station, where the items in the container may be individually placed onto a conveyor 146*b*.

For example, the scanner 142*a* and/or 142*b* may scan and identify the batch container at 142*a* or 142*b* and the human interface system 108 may instruct a device or picker to individually place item(s) from the container onto an item conveyor 146*b*, for example. For instance, a conveyor 146*b* may have segments or divisions onto which single items may be placed. In some implementations, as described below, the WES 102 may identify the items and/or orders with items in the batch container based on the scan at 142*a* and/or 142*b*. Depending on the implementation, when it identifies the batch container, the WES 102 may prepare a carton for the identified order(s), as described below.

In some implementations, the induction area 208 or other location in the facility may include other induction equipment 140 for preparing cartons for other operations described below. For instance, the facility may include one or more case erectors 252, label applicators, and/or other equipment.

A case erector 252 may include a device or station at which cartons are erected automatically or manually, for example, from flat-pack cartons and, potentially, placed onto a carton conveyor 144*a* or 144*b* or directly into a transfer station 150. FIG. 2 illustrates two case erectors 252*a* and 252*b*, although additional, fewer, or no case erectors 252 may be used. For example, a first case erector 252*a* may prepare cartons of a first size or configuration and a second case erector 252*b* may prepare cartons of a second size or configuration. Accordingly, the WES 102 may induct cartons of corresponding to order sizes (e.g., quantity or size of items in orders) into the sorting system to match identified items/orders.

For example, a case erector 252 may be utilized to automatically erect the cartons to fulfill orders. Depending on the implementation, the case erector 252 may continually prepare cartons and induct them into the system until the carton-receiving areas 322 of the transfer stations 150 are full (e.g., the WES 102 may instruct case erectors 252 to stop erecting cartons when the transfer stations 150 are full). Additionally or alternatively, the case erectors 252 or other induction equipment 140 may induct cartons responsive to and/or otherwise based on identified order(s) or an item in the order(s).

The case erectors 252 may include label applicators for applying labels to cartons or label applicators may be along a carton conveyor 144*a* or 144*b* and may apply labels to cartons as they pass. Additionally or alternatively labels may be previously applied and/or printed on the cartons to uniquely identify the cartons, which identifiers may be used by the WES 102 to identify a specific carton during the automated sorting and packing process, upon finalizing, and/or at other points.

For example, a carton may have a license plate number (LPN) or other identifier applied thereto which may be used by the WES 102 to track and identify the carton. The LPN may include or be determined based on a bar code or QR code on the carton, although other implementations are possible, such as RF ID tags, etc. The LPN may link, in the computer memory of the WES 102, a specific carton with a specific order and/or specific item(s). Accordingly, the WES 102 can verify that the correct items are placed into the correct carton.

A label applicator may autonomously apply an LPN to a carton, which is matched to an order. For instance, a label applicator may automate the process of applying a unique code or LPN to each carton. An equipment controller(s) 110, such as a programmable logic controller, may use the LPN to direct cartons either separate to or using communication with the WES 102.

Although the LPN may include or be part of a shipping label, it may be separately applied. For instance, an LPN may be applied to or associated with a carton when the carton is erected or inducted, and a shipping label may be applied to the carton at the finalizing area 214. For instance, the LPN may be scanned by a scanner 142*g* or 142*n* in the finalizing area 214 to identify the carton and associated order. The WES 102 may instruct a printer, label maker, or label applicator to print a shipping label for the identified order. Application of the shipping label may be part of the quality control process. Accordingly, the LPN can be used at finalizing to automate the shipping process.

A carton may be inducted into the system, for example, by applying or associating LPNs to the carton, which may be a container, such as a shipping carton (e.g., a cardboard box that is shipped to an external address to the facility, such as a customer's residence). Accordingly, by sorting items directly into a carton, operations can be reduced in the facility, thereby improving throughput, reducing resource (e.g., processer, electrical, and equipment) utilization, and reducing errors.

In some implementations, a carton may be conveyed and sorted using a carton sorter, which may include one or more carton conveyors 144 and other equipment that move the cartons to and from a transfer station 150 (e.g., an assigned transfer station 150) or elsewhere in a facility. For instance, a carton conveyor 144 may include a conveyor belt, conveyor rollers, chain conveyors, or similar object-handling mechanisms that move objects.

For example, FIG. 2 illustrates multiple carton conveyors 144 that convey cartons. The carton conveyors 144 may be a single conveyor or multiple conveyors. As illustrated in the example of FIG. 2, the carton conveyors 144*a* and 144*b* may move cartons from erectors 252*a* and 252*b*, respectively. Cartons may move from carton conveyors 144*a* or 144*b* and onto carton conveyor(s) 144*c*, which may convey the carton(s) past or to transfer stations 150. A carton on the carton conveyor 144*c* may be diverted from the carton conveyor 144*c* into a carton-receiving area 322 of a transfer station 150. For instance, the carton conveyor 144 may include a motorized drive roller conveyor (e.g., 450) that can divert items horizontally, for example, into a carton-receiving area 322 of a transfer station 150, although other types of diverting mechanisms, such as those described herein, are possible.

Once a carton is complete (e.g., when all items from an order are sorted into the carton), the WES 102 and/or equipment controller(s) 110 may divert items from the transfer station 150 and onto the carton conveyor 144*c*, another carton conveyor 144 (e.g., on a different side of the transfer station 150, or otherwise transported (e.g., using an AGV 114 or picker that retrieves the packed carton from the transfer station 150). For example, the WES 102 may direct the carton to be transfer to the conveyor 144*c* and, depending on availability of a finalizing station or attributes of the carton or order, to an end point. For instance, the WES 102 may direct/transfer the carton to finalizing via carton conveyors 144*d* and 144*f* or carton conveyors 144*e* and 144*n*.

In some implementations, a finalizing area 214 may include stations, printers, carton-taping mechanisms, or other devices for finalizing a carton for shipping. For example, a robot or human agent in a finalizing station of a finalizing area 214 may scan a carton (e.g., an LPN of a carton) using a scanner 142*g* and 142*n* thereby identifying the carton and associated order to the WES 102. The WES 102 may print a shipping label and/or packing slip for the carton based on the scan. The robot or agent may apply the shipping label, place the packing slip (and/or verify the items in the carton using the packing slip), close and tape the carton, and send the carton for shipping.

The item conveyor(s) 146 may include a conveyor belt, conveyor rollers, chain conveyors, or similar object-handling mechanisms that move objects, for example, the item conveyor(s) 146 may be the same or different conveyors or conveyor types as the carton conveyor(s) 144. In some implementations, items and cartons may be conveyed on the same conveyors but conveyed to different parts of a transfer station 150. In some implementations, items and cartons may be conveyed on separate conveyors, for example, as illustrated in the example configurations of FIGS. 2-3D. For example, item conveyor(s) 146 and/or carton conveyor(s) 144 may be adjacent or proximate to transfer stations 150 so that items and/or cartons can easily be transferred between the conveyors and the transfer stations 150.

Figure 3A:
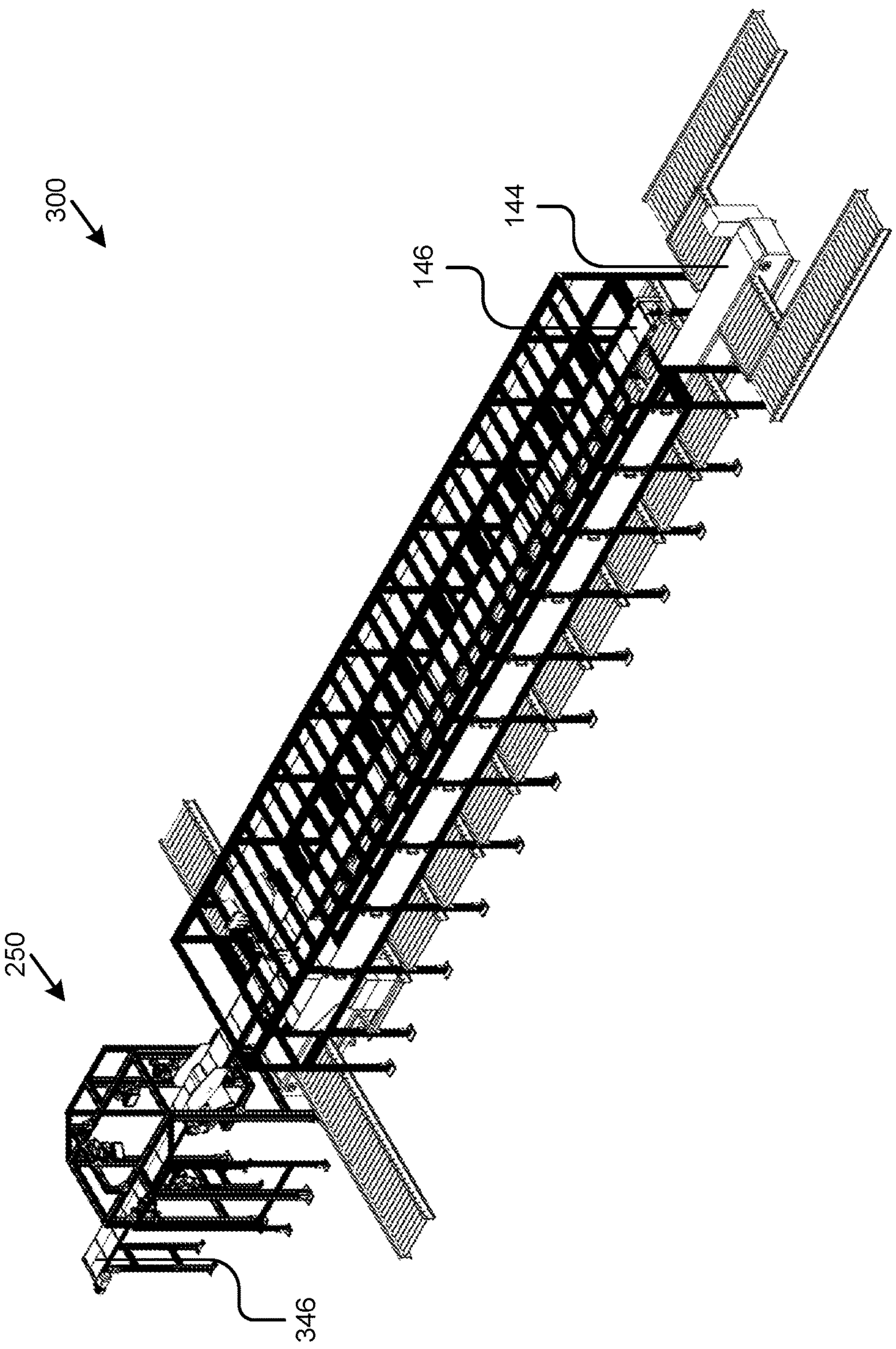
FIGS. 3A-3D illustrate an example automated sorting and packing system from various angles.

In some implementations, the item conveyor(s) 146 may be entirely or partially above or below the carton conveyor(s) 144, next to the conveyors, perpendicular, parallel, or otherwise configured. For instance, as illustrated in FIG. 3A, a carton conveyor 144 may extend partially underneath an item conveyor 146, example, when the conveyors pass next to the transfer stations 150. The item conveyor(s) 146 and/or carton conveyor(s) 144 are described in further detail below, for example, in reference to FIGS. 3A-3D.

In some implementations, items may be placed on an item conveyor 146 that conveys items passed one or more scanners 142. For example, a batch container may be scanned at scanner 142*b* at which the WES 102, via the human interface system 108, may instruct a robot or human agent to place the items in the container onto the conveyor 146*b*, for example, one by one. The conveyor 146*b* may convey the item(s) past scanners 142*c*, 142*d*, 142*e*, and/or 142*f*, which may be organized into a scan tunnel 250, and which may scan the item (e.g., optically scan to identify visual aspects, bar codes, labels, etc., of the item(s)) and transmit the identifying information to the WES 102. The scan tunnel 250 may be located in advance of the transfer stations 150 along a direction of movement of one or more item conveyors 146, so they scan an item before it reaches a transfer station 150. In some implementations, the scan tunnel 250 may house one or more scanners 142 so that they point toward items on the item conveyors 146. A scan tunnel 250 is described in further detail below in reference to the example of FIG. 4A.

In some implementations, once the scanned item(s) pass through the scan tunnel 250 where they are identified, they are then conveyed on the same or a separate conveyor 146*n*. The WES 102 may track an item's position on the item conveyors 146 using further scans, optical or other sensors, or based on a known position of the item on the item conveyor(s) 146, for example, based on the scan and/or a position of the conveyor(s) (e.g., based on a movement or position data of the conveyor(s)).

The item conveyor 146*n* may convey items to or past one or more transfer stations 150, which may be configured to transfer items between an item conveyor 146*n* and a carton. Example transfer stations 150*a*, 150*b*, 150*c*, 150*d*, 150*e*, 150*f* are located along a first side of an item conveyor 146*n* and transfer stations 150*f*, 150*g*, 150*h*, 150*i*, and 150*n* are located along a second, opposing side of the item conveyor 146*n*. Accordingly, items can be diverted perpendicularly to a direction of travel of the item conveyor 146*n* into transfer stations 150 on either side. In some implementations, the transfer stations 150*a*-150*n* may be located in sequence next to each other (e.g., touching each other) in a high-density to improve space utilization and sorting speed. Example diverters 148 and transfer stations 150 that allow the close proximity and rapid sorting are described in further detail below. It should be noted that other configurations are possible and contemplated. For instance, although an example layout and quantity of transfer stations 150 are shown, they may be different in number, layout, or configurations.

In some implementations, one or more items may be diverted into a transfer station consolidation area 426 of a transfer station 150 and a carton may be transferred into a carton-receiving area 322 of the transfer station 150. The transfer station 150 may then be instructed, by the WES 102 to transfer the item(s) into the carton, as described elsewhere herein. A diverter 148 for transferring items from an item conveyor 146 may be a pneumatic pusher, motorized arm, movable wall, paddle-conveyor system (e.g., the diverter mechanism 450), or other devices, as described in further detail below.

A transfer station 150 may use various mechanisms for transferring items into a carton. For example, a transfer station 150 may include a robotic arm that manipulates items, a diverter 148 that slides items into a carton, a trap door that drops items into a carton, a chute that slides items into a carton, other mechanisms, and/or combinations thereof. Example implementations of the transfer station 150 are described in further detail below.

In some implementations, the one or more item conveyors 146 may include or terminate an exemption or jackpot zone 206 to which items may be transported, for example, if there is an error or exemption. For example, if the WES 102 determines that no transfer station 150 is available to assign an order, item, or carton, an item may be transported to a jackpot area 206 at which a robot or human agent may manually or automatically sort the item into a carton or set it aside for later use. Similarly, if an item is not properly scanned, was improperly picked (e.g., to a batch container), or another error is present, the WES 102 may direct the one or more item conveyors 146 to the jackpot area 206.

Although other implementations are possible and contemplated herein, example steps for picking, sorting, packing, and finalizing an order are illustrated in the paths 262*a*, 262*b*, 264*a*, 264*b*, and 264*c*. For example, as described above, the WES 102 may select a set of orders with an associated set of items to be picked by a human agent or AGV 114*a* and/or 114*b*, which may follow the path(s) 262*a* and/or 262*b* to collect the set of items for the batch (e.g., into one or more containers, a cart, etc., as noted elsewhere herein). The set of items may be transported to the item conveyor 146*a* and conveyed (e.g., in a carton or directly on the item conveyor 146*a*) to an induction area 208 via the path 264*a* or, alternatively, the batch of items may be brought directly to the beginning of the conveyor 146*b*. In implementations where the set of items in the batch is in one or more containers, the containers may be associated with the items sorted therein as well as the orders associated with those items. The batch container may be scanned at the scanner(s) 142*a* and/or 142*b* to identify the batch. At this point, earlier (e.g., upon selecting the set of items for the batch), or later (e.g., upon scanning by the scan tunnel 250), transfer stations 150 may be assigned and/or cartons may be prepared and sent to corresponding transfer stations 150, as described in further detail below.

In some implementations, the set of items may be placed individually on an induction conveyor (e.g., 346), which may be item conveyor 146*b* and pass through the scan tunnel 250. For instance, an item may be placed individually on the item conveyor 146*b* at the path 264*b*, where it is conveyed through the scan tunnel 250, onto item conveyor 146*n*, and then diverted into an assigned transfer station 150*b*, for example, into a consolidation area 426 of the transfer station 150*b*. In some implementations, if all items for a given carton and/or order are in the consolidation area 426 of the transfer station 150*b* (or based on another trigger), the WES 102 or equipment controller(s) 110 may transfer the item(s) into a carton in a carton-receiving area 322 of the transfer station 150 (e.g., which may have been transferred, in coordination with the item(s), to the transfer station 150). The carton into which the item was transferred may be diverted onto the carton conveyor 144*c* upon completion and determination of an opportunity on the carton conveyor 144*c*. As illustrated in the example, the carton may be conveyed on the path 264*c* using the carton conveyors 144*c*, 144*e*, and 144*n* to the finalizing area 214. In some instances, upon arriving at the finalizing area 214, the carton (e.g., the LPN on the carton) may be scanned by the scanner 142*n*. The WES 102 may identify the carton and associated order based on the scan data. The WES 102 may then mark the carton or order as complete, print a packing slip, print a shipping label, request verification that the items in the carton are correct, or perform other operations.

In some implementations, items may be placed in parallel along a length of a conveyor, such as the induction conveyor 346 or item conveyor 146*b*. For instance, a series of robots or induction stations (e.g., at which humans, AGVs 114, or other devices may place items onto the conveyor) may be located along a length of the conveyor so that items may be placed individually on the conveyor in parallel with other items. Accordingly, in implementations where the conveyor moves more quickly than a robot or human picker can place the items on the conveyor, multiple robots (or humans or other devices) may be used to place items at multiple locations along the conveyor at the same time. The WES 102 may automatically coordinate the locations where items are placed on the conveyor by different robots, for example, by tracking current locations on the conveyor belt, items at the locations, and relative locations of robots that can place items on the conveyor (e.g., in a dynamically updated data table linking items, locations, and induction/robot locations). Accordingly, the WES may coordinate the placement of multiple items on the conveyor simultaneously, which, in some implementations, may occur while the conveyor is moving.

Other equipment and configurations may also be included, although not illustrated in FIG. 2. For example, the system may include separate label (e.g., LPN and/or shipping label) applicators, scanners 142 along the conveyors, scanners 142 at transfer stations 150, diverters 148 between conveyors (e.g., at the intersection of carton conveyors 144*c*, 144*d*, and 144*e*), or other equipment.

Figure 3B:
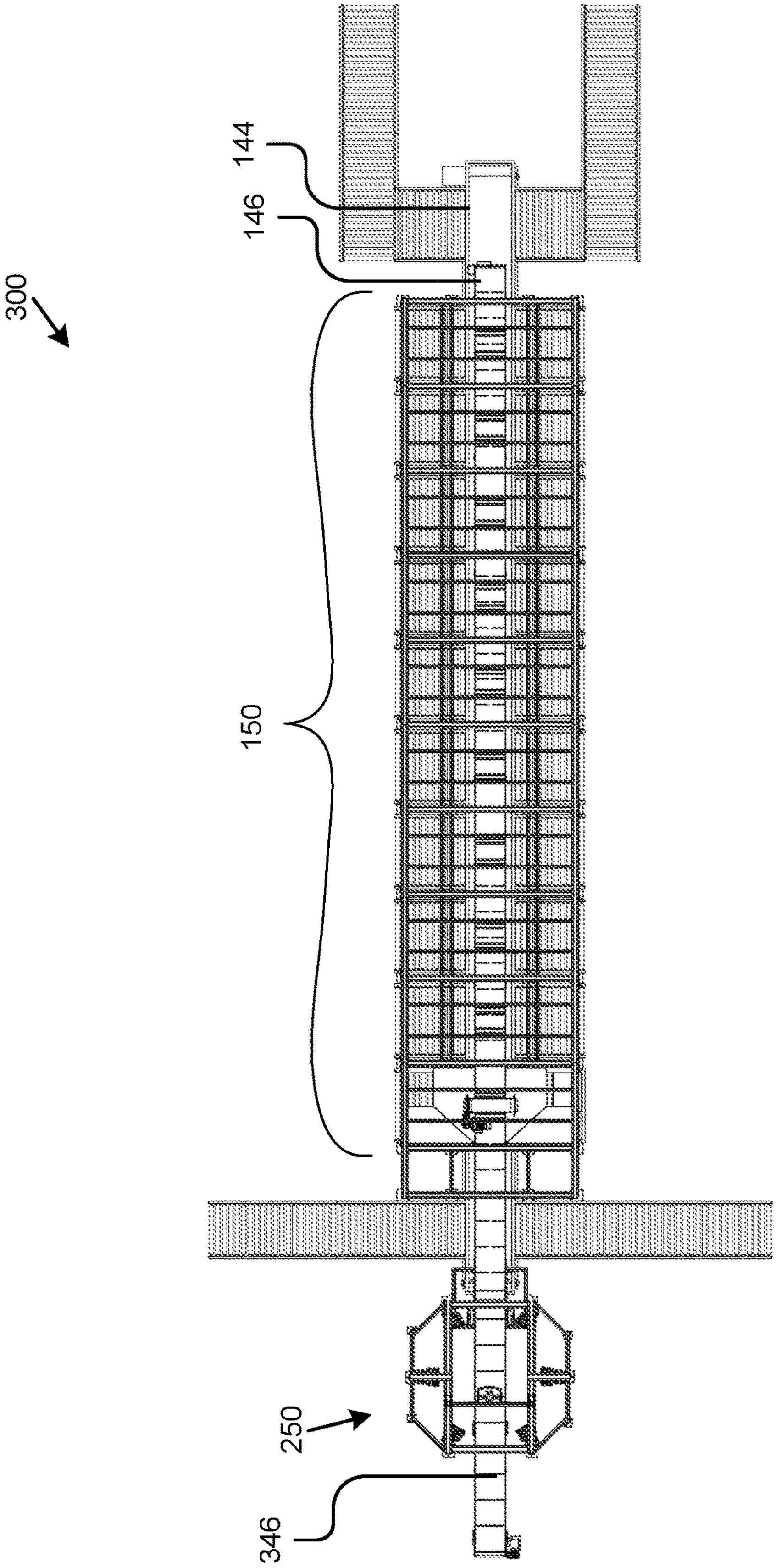
Figure 3C:
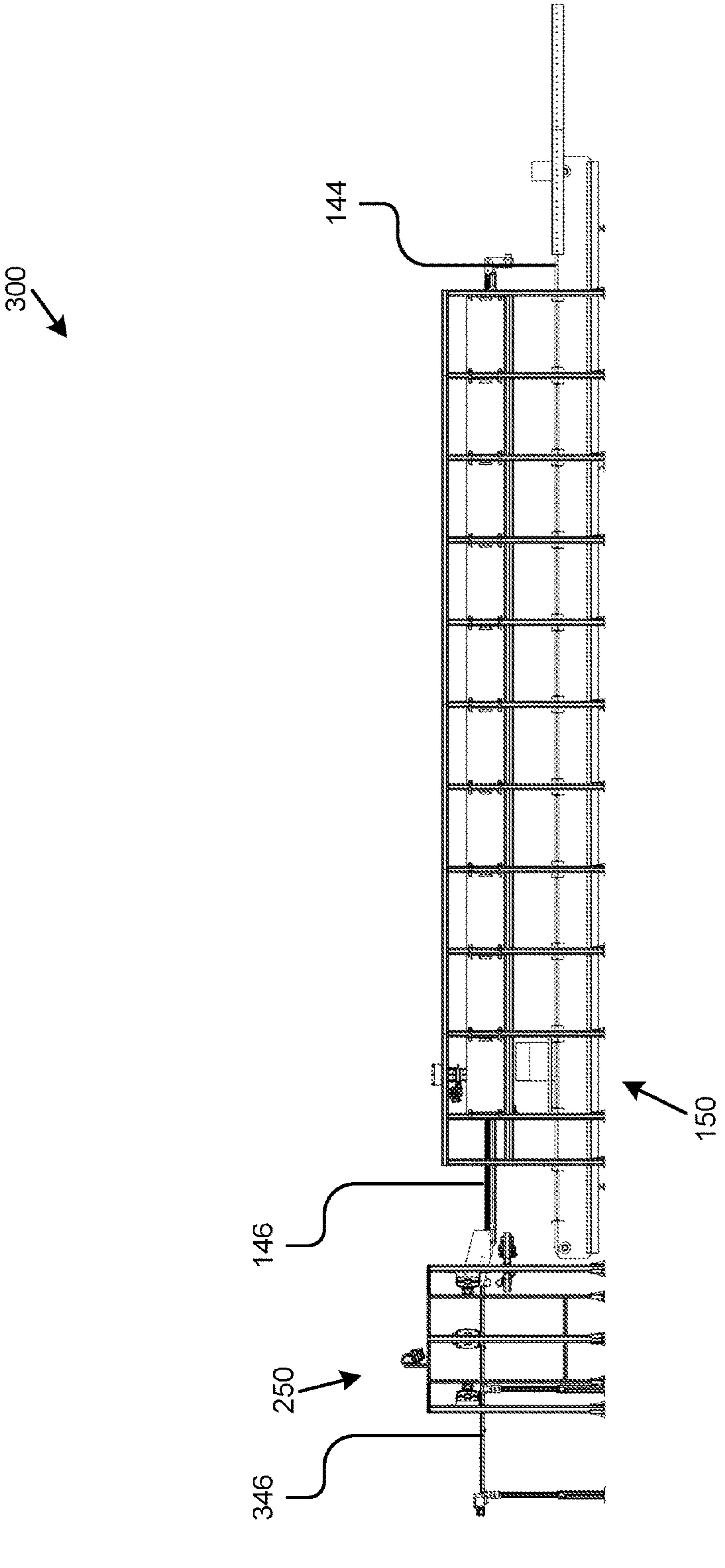

FIGS. 3A, 3B, and 3C illustrate an example automated sorting and packing system 300 from various angles. FIG. 3A illustrates the example system 300 from a perspective view, FIG. 3B illustrates a top-down view of the example system 300, and FIG. 3C illustrates a right-side view of the example system 300.

As illustrated in FIGS. 3A-3C, the example automated sorting and packing system 300 may include a scan tunnel 250, item sorter, and carton sorter, although other implementations are possible. Various details and example features of the example automated sorting and packing system 300 are described elsewhere herein.

As illustrated, a scan tunnel 250 may be located at the beginning of an item sorter, which is configured to sort items into transfer stations 150 and/or into cartons. For example, the item sorter may include item conveyor(s) 146, diverters, transfer stations 150, and/or other equipment.

As illustrated in the examples, the system may include an item conveyor 146 with a conveyor belt, which passes by multiple transfer stations 150 (e.g., ten transfer stations 150 or chutes are illustrated on each side of the item conveyor 146). For instance, the item conveyor 146 may include a cleated belt with a zone for each product. The item conveyor 146 may have a variable frequency drive, which allows it to stop or move accurately to allow items to be scanned or diverted, for instance. The item conveyor 146 may include stopping or homing sensor(s), which indicate when an item is next to the correct/assigned chute 428 or transfer station 150. The variable frequency drives and homing sensors may allow the equipment controller(s) 110 or WES 102 to determine when an item has crossed a threshold and should be diverted into a certain transfer station 150 or otherwise tracked.

FIGS. 3A-3C illustrate ten transfer stations 150 flanking each of the item conveyors 146 and carton conveyors 144. Although only two of the twenty illustrated transfer stations 150 are illustrated as including chutes 428 and diverter mechanisms 450 for simplicity, the transfer stations 150 may include the same or different configurations. For instance, some of the transfer stations 150 may be designed to accommodate different sizes of orders or cartons or they may be configured to be applicable to any size order or carton. Example transfer stations 150 are described elsewhere herein, for instance, in further detail below in reference to FIGS. 4B-4H.

The item sorter may include item chutes 428 and/or transfer stations 150 (e.g., a transfer station 150 may include a chute 428) located along an item conveyor 146. The item sorter may also include one or more diverters, as described elsewhere herein, which divert items from the item conveyors 146 into a chute 428 and/or transfer station 150. For instance, a transfer station 150 may be proximate to an item conveyor 146, so that a diverter may divert an item from the item conveyor 146, into a chute 428 of the transfer station 150, which causes the item to slide to a consolidation area 426 of the transfer station 150, as described in further detail below.

In some implementations, as illustrated in the example of FIGS. 3A-3C, an item conveyor 146 may include one or more conveyors that extend longitudinally along an axis and may pass through a scan tunnel 250 and past one or more transfer stations 150, although the item conveyor(s) 146 may have one or more bends or turns. Similarly, the transfer stations 150 may be on a single side, both sides, or configured differently. The transfer stations 150 may be closely spaced, for example, touching each other, in order to increase number of stations that fit in the available space.

In some implementations, the one or more item conveyors 146 may include an induction conveyor 346, which passes through the scan tunnel 250 and from which items may fall or be transferred from the induction conveyor 346 onto another item conveyor 146. The induction conveyor 346 may include painted lines on a conveyor belt, which are spaced so that a robot (e.g., using an optical sensor) or human agent can view the lines and place an item between each line. The space of between the lines may be referred to as an induction zone, and each induction zone may be large enough to fit an item and separate the item from other items on the induction conveyor 346 (e.g., to allow the item to be scanned without interference). In some implementations, depending on the configuration of the scanners 142, items may be placed with a UPC (universal product code) barcode facing upward in each induction zone.

The automated sorting and packing system may also include a carton sorter, which transports cartons (e.g., shipping cartons or boxes) to or from transfer stations 150. For example, a carton sorter may include one or more carton conveyors 144, scanners 142/sensors, diverters, and other devices. For example, a carton conveyor 144 may extend parallel and underneath an item conveyor 146, as illustrated, in order to efficiently use space, and allow the carton conveyor 144 to receive items from transfer stations 150 on both sides.

In some implementations, the one or more carton conveyors 144 may start at a case erector 252, pass transfer stations 150, and/or end in a finalizing area 214. For instance, as illustrated in reference to FIG. 2, one or more carton conveyors 144 may originate at multiple case erectors 252, combine into a single conveyor below an item conveyor 146, and then branch off again to multiple finalizing stations in a finalizing area 214, although other configurations are possible. For instance, one or both of the item conveyors 146 and carton conveyors 144 may have multiple lanes or branches that convey objects to different areas, transfer station(s), induction area(s), or finalizing area(s).

Figure 3D:
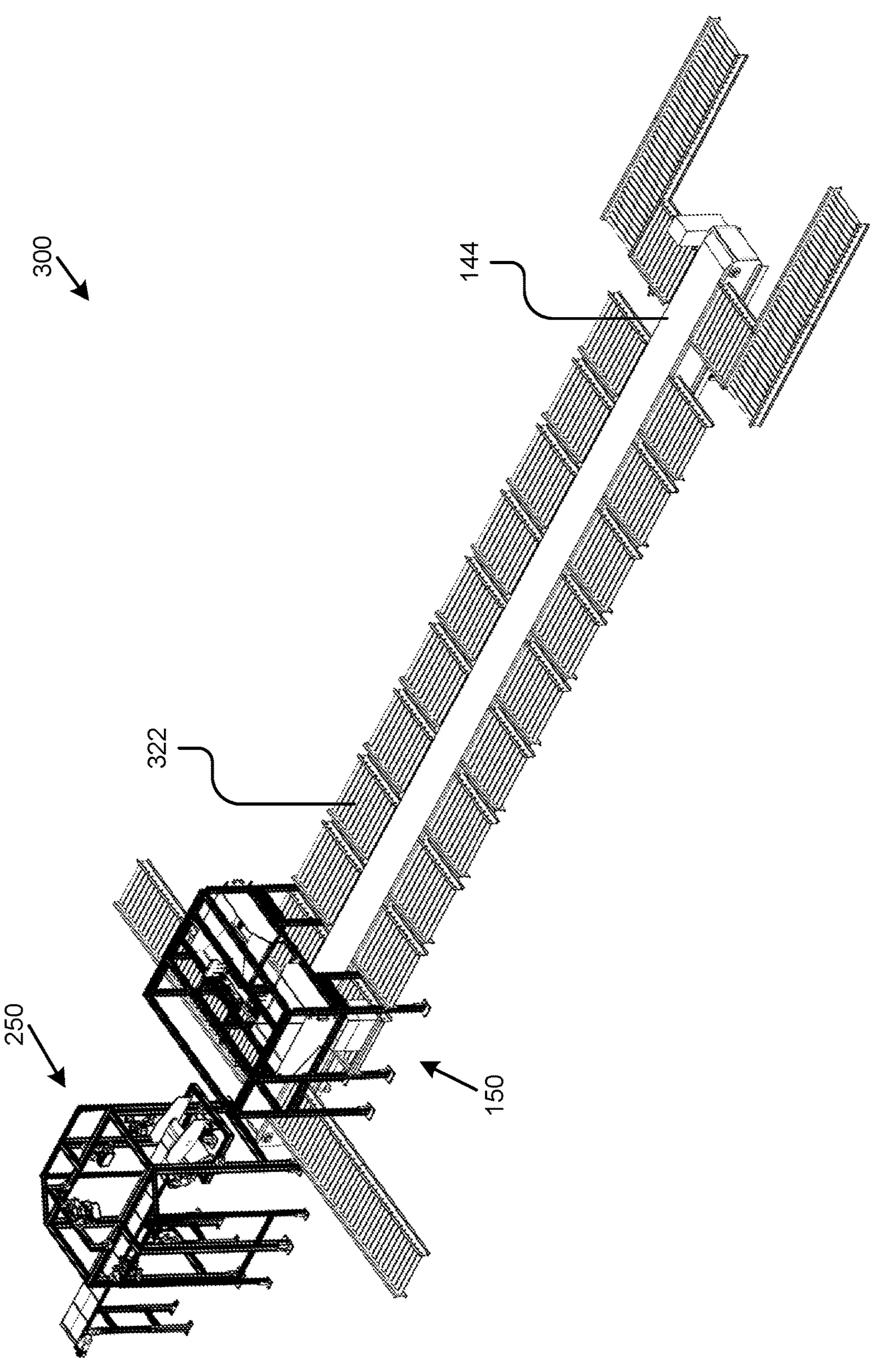

For example, FIG. 3D illustrates an example automated sorting and packing system 300 in which item conveyor(s) 146 and several transfer stations 150 are removed to provide better visibility to example carton conveyor(s) 144, for purposes of discussion herein. As illustrated, each transfer station 150 may include a carton-receiving area 322, which connects to, is adjacent to, or is otherwise proximate to a carton conveyor 144, so that cartons may be transferred between the carton-receiving area 322 and the carton conveyor 144. In some implementations, a carton-receiving area 322 may include rollers, a conveyor, or another mechanism for transporting a carton within the carton-receiving area 322 or to/from the carton conveyor 144. For example, a carton may be transferred from the carton conveyor 144 into a carton-receiving area 322 using a diverter or attribute of the carton conveyor 144. For example, a ninety-degree high-speed sorter may be used to move items horizontally on/to/from a carton conveyor 144. For instance, the carton conveyor 144 may use a combination of electric and pneumatic actuating devices. Additionally, the cartons may be tracked on the carton conveyor 144 using a combination of electrical sensors and encoders after the carton is scanned.

The carton-receiving area 322 may allow the item to roll or may transport the carton, so it is located under a chute 428 and/or door of the transfer station 150. In some implementations, the carton conveyor 144 may allow items to move, stop, or move sideways, for example, by using a precision move conveyor, such as those from Dorner™, Vention™, or a Celluveyor™ by Cellumation™.

Figure 4A:
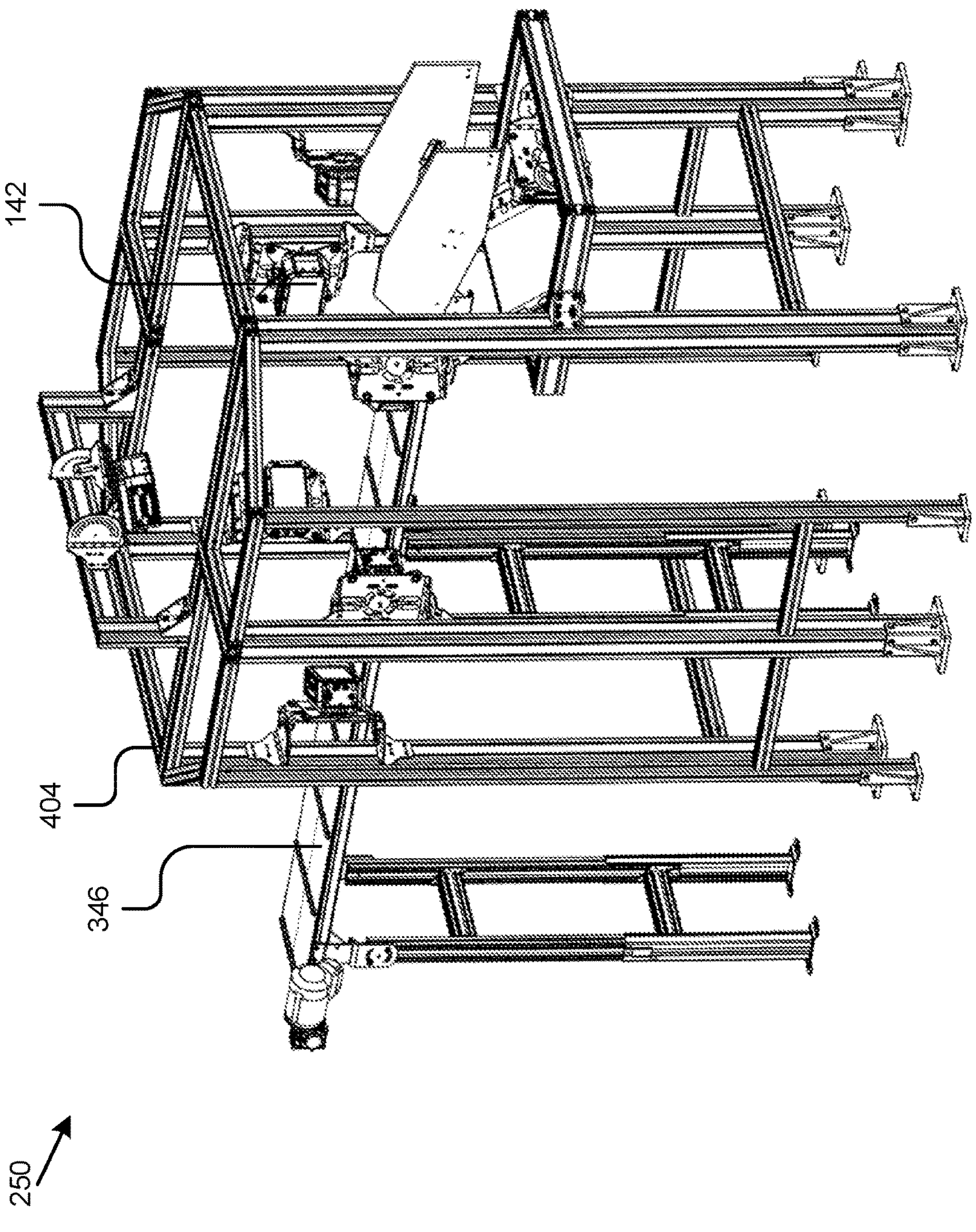
FIG. 4A illustrates an example scan tunnel.

FIG. 4A illustrates an example scan tunnel 250. Although other configurations are possible, optical or other scanner or sensors may be located along an item conveyor 146, for example, on an induction conveyor 346, as discussed above. For example, the scan tunnel 250 may include a frame 404 that houses or surrounds an induction conveyor 346. One or more scanners 142 may be coupled with the frame 404 and pointed toward the induction conveyor 346 and/or a location above the induction conveyor 346 where items pass. For example, although other implementations are possible, the example scan tunnel 250 illustrated in FIG. 4A includes six scanners 142 facing various sides and one scanner 142 facing a top of an item on the induction conveyor 346, so an item can be identified in various orientations. The scanners 142 may be communicatively coupled with the equipment controller(s) 110 and/or WES 102 to transmit scan data, which identifies or may be used to identify items on the induction conveyor 346. For example, the scanner(s) 142 may capture a visual attribute or barcode on the item. It should be noted that other scanners 142 and configurations thereof may be used without departing from the scope of this disclosure.

Figure 4B:
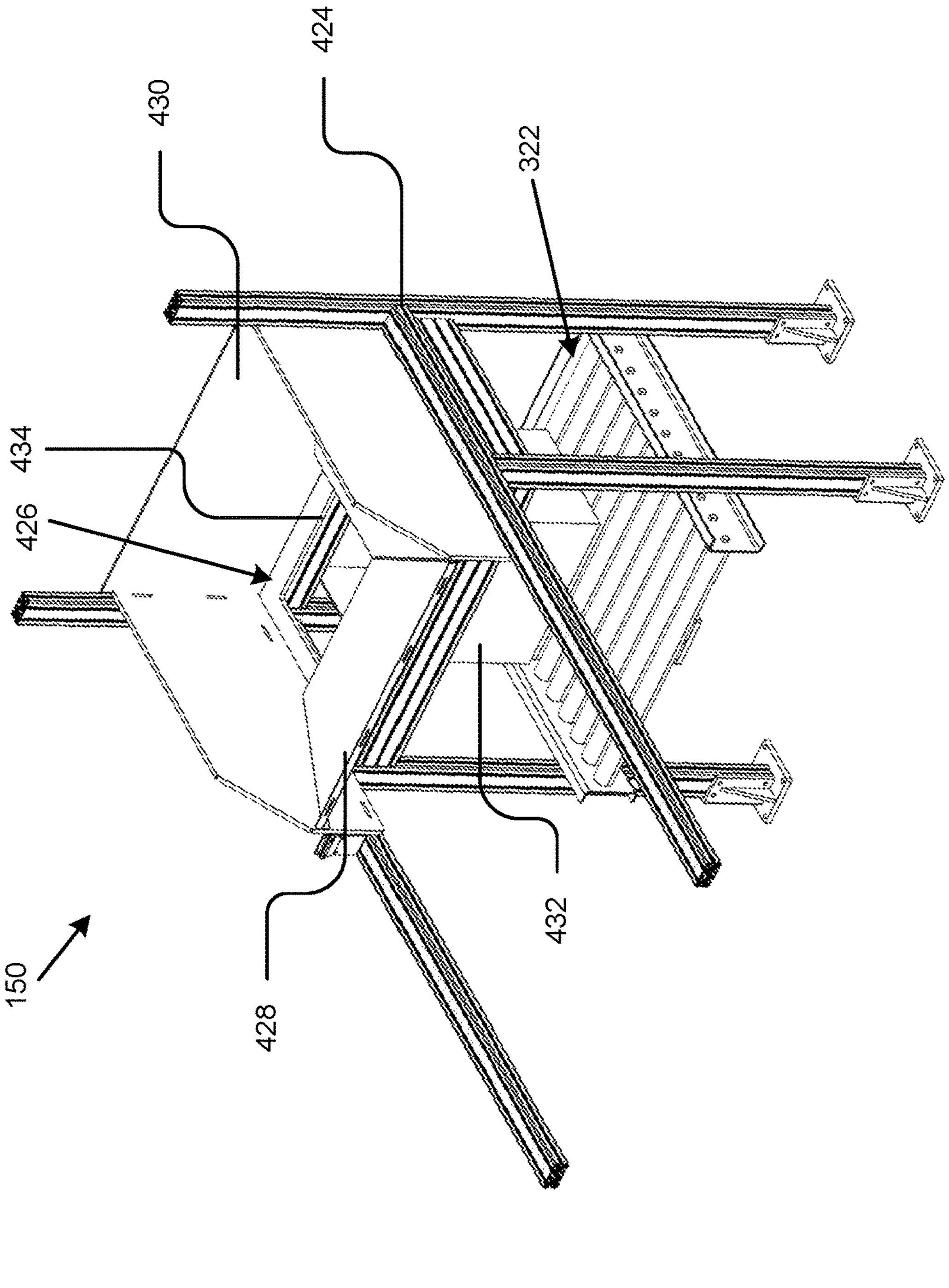
FIGS. 4B-4E illustrate various views of example transfer stations.

FIG. 4B illustrates an example transfer station 150. The example illustrated transfer station 150 includes a frame 424, an item or transfer station consolidation area 426, a chute 428, and a carton-receiving area 322. Other implementations, configurations, and devices may be used in addition or alternative to those described in reference to FIG. 4B, as noted elsewhere herein, such as in reference to FIGS. 4C-4H.

The carton-receiving area 322 may include rollers, conveyors, or other mechanisms, which align a carton to a corner, edge, or center of the carton-receiving area 322. For instance, a carton conveyor 144 (not shown in FIG. 4B) may, either using a feature of the carton conveyor 144 or using another diverter mechanism, divert a carton into the carton-receiving area 322, which may align the carton to a defined point. For example, FIG. 4B illustrates an example carton 432 at a back-side corner in the carton-receiving area 322. An opening 434 in the consolidation area 426 may be located at the same corner, so that items may be transferred into any size of carton aligned at the corner.

In some implementations, the transfer station 150 may also include chute walls 430 that prevent items from falling out of the chute 428 or consolidation area 426. One or more of the chute walls 430 may be transparent and/or hinged to allow blockages to be detected and/or dislodged. Additionally, the transfer station 150 may include a sensor that detects when items are in the consolidation area 426, so that blockages may be identified (e.g., if items are still present after they should have been transferred).

The chute 428 may have one or more sloped walls, so that items diverted into the transfer station 150 rest on the chute 428 and/or a door of the opening 434. For instance, the opening 434 may be closed by a door (e.g., 464), as described elsewhere herein.

As illustrated in the example of FIG. 4B, the frame 424 may hold the consolidation area 426 (e.g., with the chute 428 and opening 434) above the carton 432 and carton-receiving area 322. The frame 424 may couple the transfer station 150 to an item conveyor 146, carton conveyor 144, other transfer stations 150, and/or other objects. The frame 424 may also provide mounting points for various scanners 142, sensors, diverters, or other components. The frame 424 may be constructed from extruded aluminum, as shown in the example, but many other constructions are possible and contemplated herein.

Figure 4C:
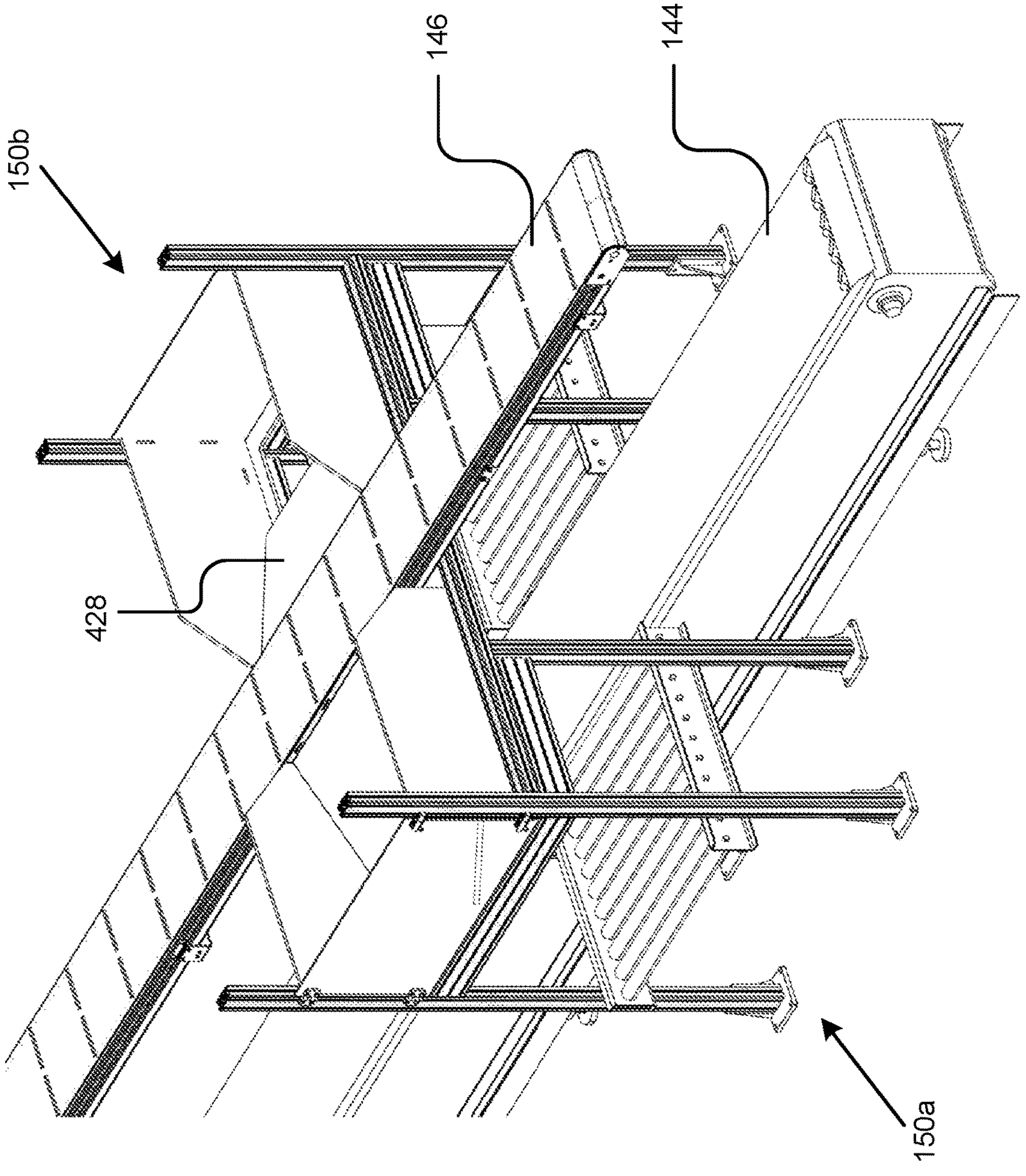

FIG. 4C illustrates an example pair of transfer stations 150*a* and 150*b* where one is on each side of an item conveyor 146 and a carton conveyor 144, each of which may be configured as illustrated and described in reference to FIG. 4B. As shown, a transfer station 150*a* may have both the item conveyor 146 and carton conveyor 144 on a single side, although other implementations are possible, such as where the two conveyors are on opposing sides, perpendicular, or otherwise configured.

As shown in the example of FIG. 4C, a chute 428 may be located downward from the item conveyor 146 (e.g., a top of the chute 428 may descend from an elevation of a top surface of the item conveyor 146) so that when an item is diverted from the item conveyor 146 onto the chute 428, the sloped wall/floor of the chute 428 causes the item to slide toward a door or opening 434 of the consolidation area 426. Additionally, in some implementations, a top surface of the carton-receiving area 322 (e.g., the rollers or conveyor thereof) may be level with a top surface of the carton conveyor 144, so that cartons can move to and from the same carton conveyor 144, although other implementations are possible (e.g., where the filled carton is transferred onto a separate, lower carton conveyor 144).

For example, as illustrated in the example of FIG. 4C, the transfer station 150 may include a consolidation area 426 proximate to an item conveyor 146 and a carton-receiving area 322 proximate to a carton conveyor 144. The carton conveyor 144 may be partially underneath and parallel with the item conveyor 146 at a point where the item conveyor 146 and carton conveyor 144 are each proximate to the transfer station 150. The consolidation area 426 may be at a higher elevation than the carton-receiving area 322.

Figure 4D:
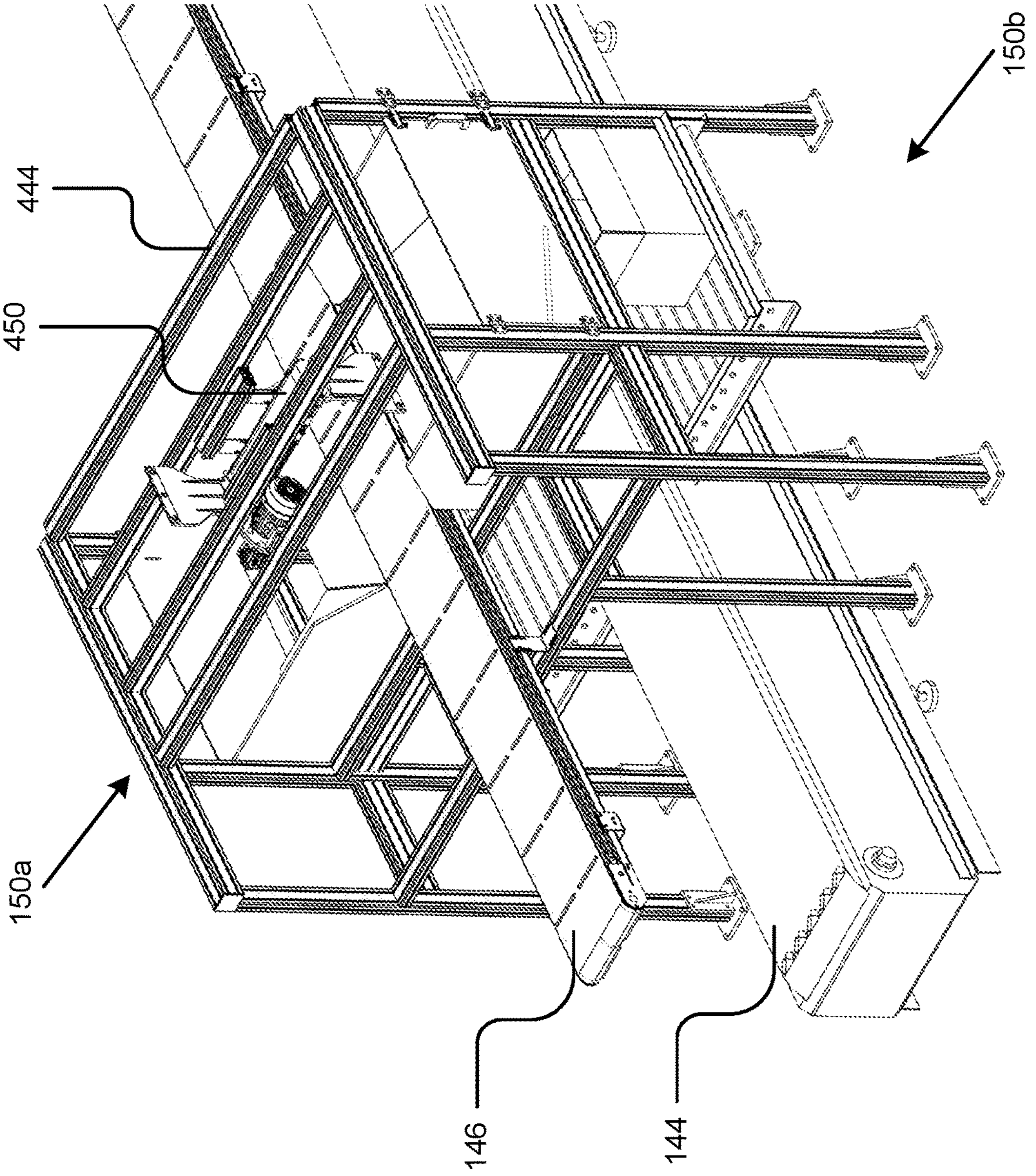
Figure 4E:
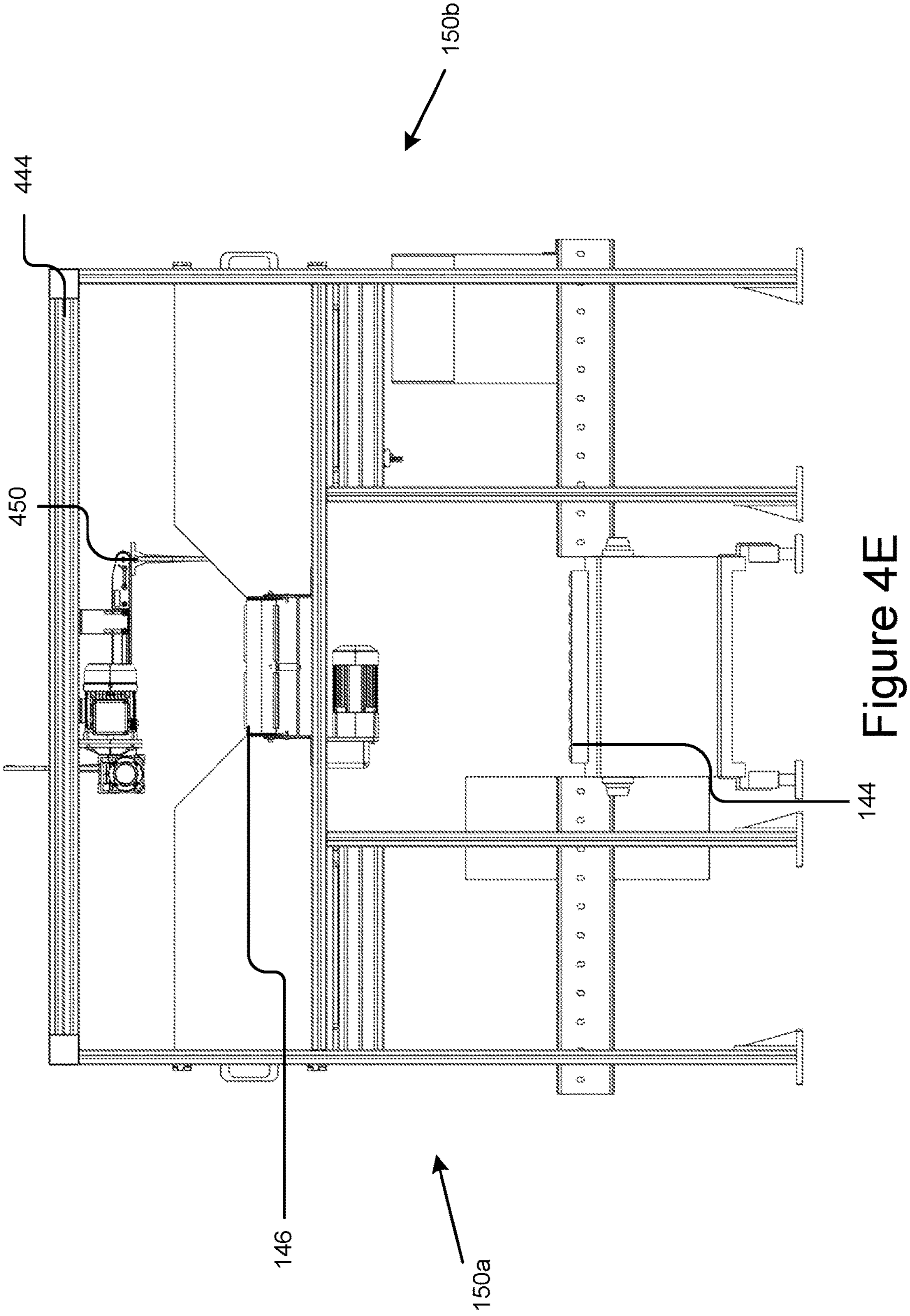

FIGS. 4D and 4E illustrate a pair of transfer stations 150 with an additional frame 444 located above the transfer stations 150 to hold an example diverter mechanism 450. FIG. 4D illustrates a perspective view of the transfer stations 150 and FIG. 4E illustrates an end view of the transfer stations 150. As illustrated in the example of FIGS. 4D and 4I, the diverter mechanism 450 may include a conveyor belt 480 with paddles 482 mounted thereto.

Figure 4F:
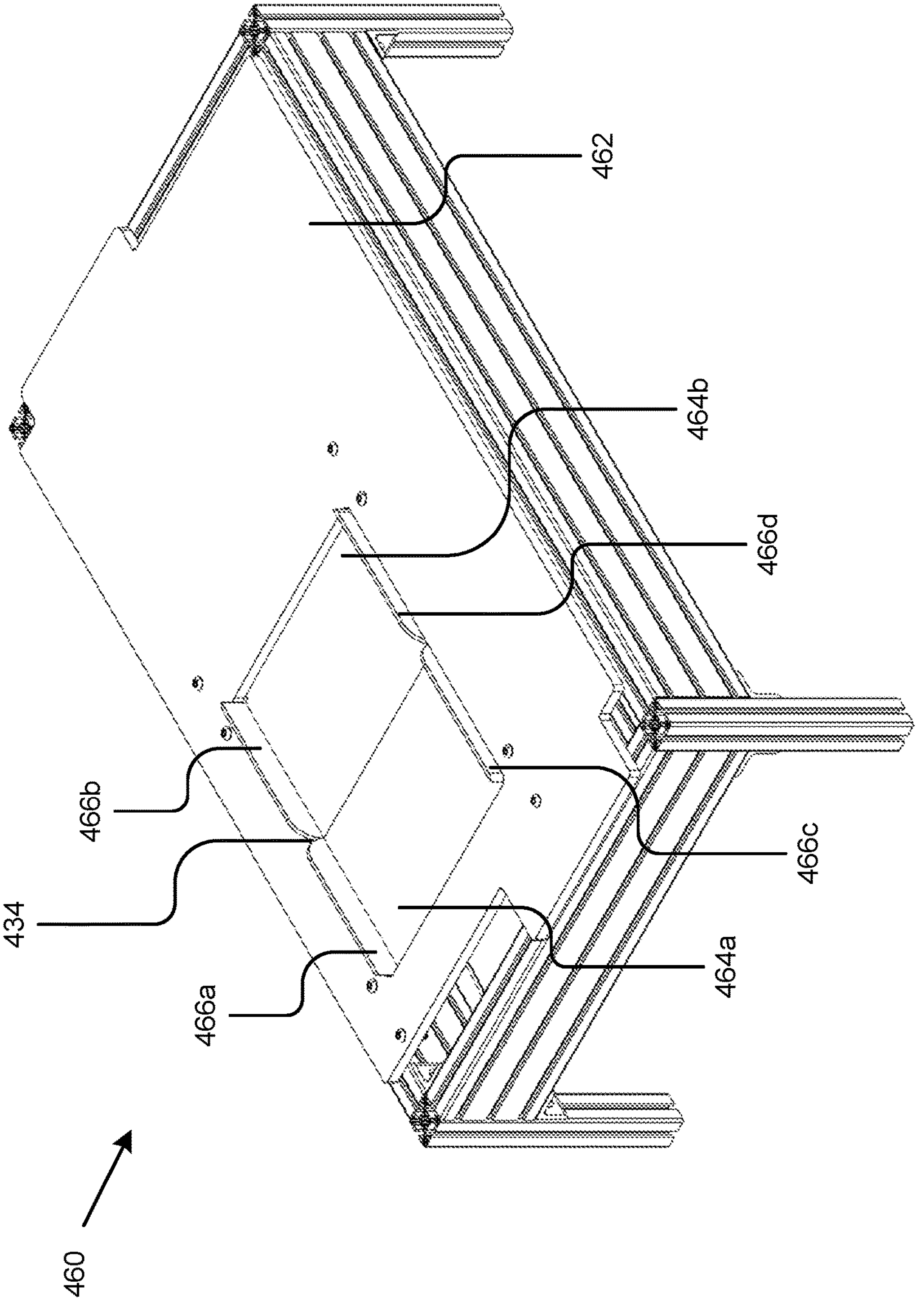
FIGS. 4F-4G illustrate various views of an example transfer-station table of an example transfer station in a closed position.
Figure 4G:
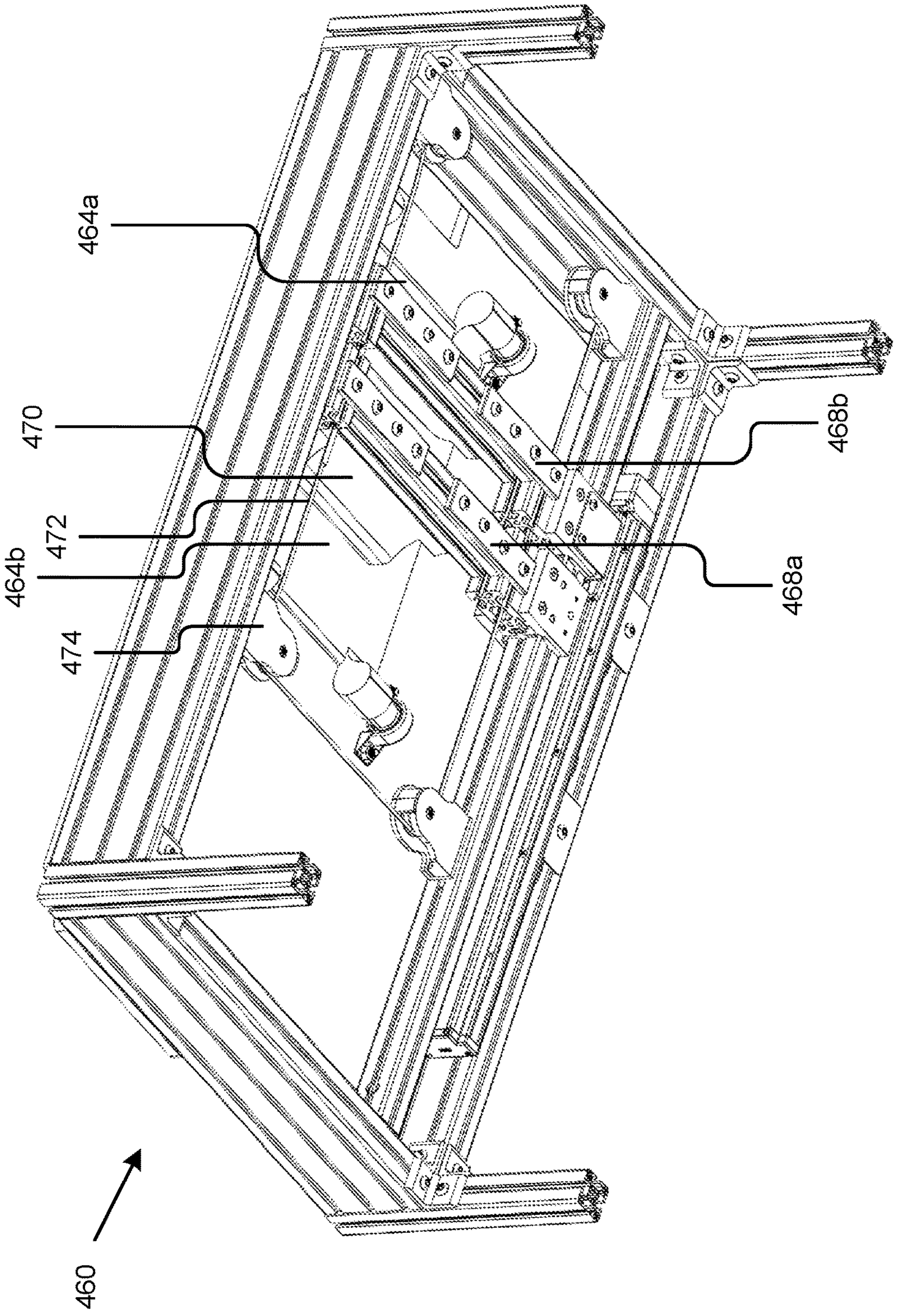
Figure 4H:
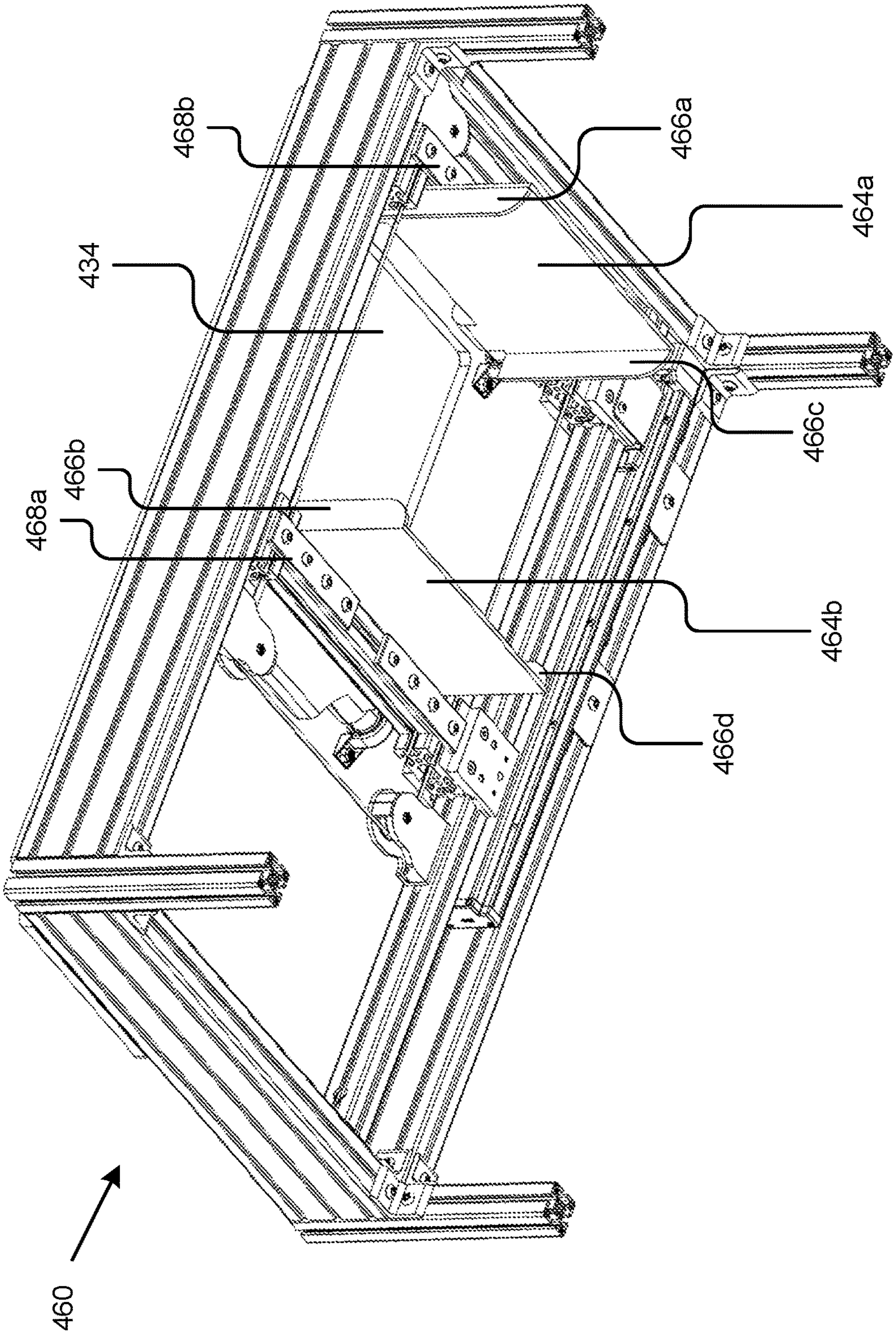
FIG. 4H illustrates an example transfer-station table of an example transfer station in an open position.
Figure 4I:
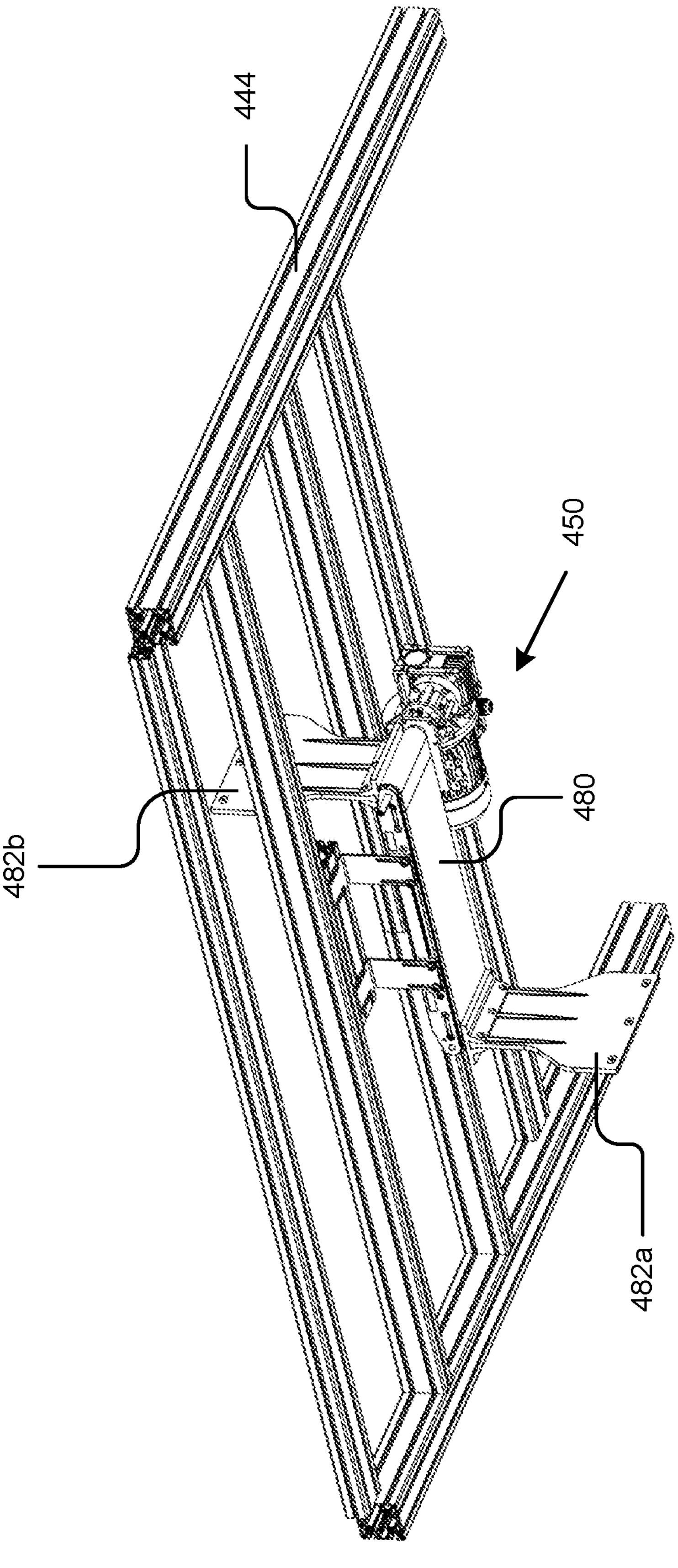
FIG. 4I-4K illustrate various views of an example diverter mechanism.

FIGS. 4F, 4G, and 4H illustrate an example transfer-station table 460, which may be a component of the transfer station 150, although it may be used separately or in a different configuration. For instance, for visibility, the chute 428, chute walls 430, part of the frame 424, and carton-receiving area 322 have been removed to illustrate example mechanisms of the transfer-station table 460.

FIG. 4F illustrates a top-perspective view of the transfer-station table 460 with a top surface 462 where the opening aperture or passage 434 is closed by a door mechanism, which may include a trap door where two door members 464*a* and 464*b* open outward from a center seam, as illustrated in FIG. 4H. For example, a top surface of the door members 464*a* and 464*b* may support items in the consolidation area 426 when the door mechanism is closed.

FIG. 4G illustrates a bottom-perspective view of the transfer-station table 460 with the door mechanism in a closed position, and FIG. 4H illustrates a bottom-perspective view of the transfer-station table 460 with the door mechanism in an open position. For example, a transfer station 150 may include a chute door closing the opening/passage 434, which is at the consolidation area 426 and coupled with an electrical actuator, such as a linear actuator. The electrical actuator may retain the chute door in a closed position when one or more items are in the consolidation area and open or allow to open the chute door in response to a signal from the WES 102 and/or equipment controller(s) 110.

In some implementations, the transfer station 150 may include one or more guides for guiding items into a consolidation area 426 (e.g., the chute 428) and/or from the consolidation area 426 into a carton. A transfer station 150 may include a guide member adapted to guide the item into the shipping carton when it is transferred from the consolidation area 426, for example, when the chute door is an open position. For example, FIGS. 4F and 4H show example guide members 466*a*, 466*b*, 466*c*, and 466*d*, which may be side walls that open with the door members 464*a* and 464*b*, although additional, fewer, or different guide members 466 may be used. For example, a guide member 466 may include a surface that, when coupled with a door member 464, form a side wall that prevents items from falling sideways out of a carton when the pass through the opening 434. Additionally, the door member(s) 464 may also guide items into the carton and prevent them from falling outside of the carton.

The transfer-station table 460 may use various mechanisms to open and/or close the door member(s) 464. In some implementations, the transfer-station table 460 may use one or more motors, which cause the doors to pivot and/or one or more actuatable latches that hold the door member 464 closed when weight (e.g., due to items) is placed thereon. For example, the transfer-station table 460 may actuate (e.g., using a motor) a latch to allow a door member 464 to open due to the weight of an item or the pressure exerted by a motor. Once the item has dropped through the opening 434, the spring or the motor may close the door member(s) 464 and/or close the latch.

In some implementations, the transfer-station table 460 may use linear motion to counter rotational motions of the door member(s) 464. For example, an electrical actuator may connect to a door member 464 to pull the door open and/or push the door closed.

In some implementations, the transfer-station table 460 may use a pair of door members 464*a* and 464*b* (e.g., with a seam in the middle), which may reduce torque on a single door and decrease the probability that the single door may contact an item when closing. The transfer-station table 460 may also include bars 468*a* and 468*b* or other members that provide support to the door members 464*a* and 464*b*. When the WES 102 or equipment controller(s) 110 send a signal to the transfer-station table 460, which translates the bar(s) 468 (e.g., perpendicularly to their longitudinal axis) thereby removing vertical support for the door member(s) 464 and/or providing force pulling the door member(s) 464 into an open position. Similarly, when the items have been dropped, after a defined time period, or responsive to another condition, the transfer-station table 460 may move the bar(s) 468 back to under the door member(s) 464 thereby providing vertical support.

In some implementations, the transfer-station table 460 may include stepper motors, linear or other electrical actuators, pulleys, and/or other devices to move the bar(s) 468. For example, the WES 102 may signal (either directly or via the equipment controller(s) 110) an electrical actuator to move one or both of the bars 468. In some implementations, the bars, motors, and/or linear actuators may be linked by cords, cables 472, chains, belts, and/or pullies 474, for instance, which cause the two bars 468*a* and 468*b* to move together.

In the illustrated example of FIG. 4G the bars 468*a* and 468*b* are illustrated pushed towards each other, thereby supporting the door members 464*a* and 464*b*. In the illustrated example of FIG. 4H, the bars 468*a* and 468*b* have been moved apart to allow or cause the door members 464*a* and 464*b*.

In some implementations, the bars 468*a* and 468*b* may be coupled to or include one or more cams 470 (a cam for the bar 468*b* is not labeled) that contact the door member(s) 464 to push the door members 464 open or allow them to smoothly close. For instance, a cam 470 may be a curved component that decreases friction and/or relative torque on the door member(s) 468 at various points of movement. Additionally or alternatively, a cam may be coupled with a motor or other actuator to open or close the door member(s) 464.

FIG. 4I illustrates an example diverter mechanism 450, which is mounted to a frame 444. Although other implementations are possible and contemplated herein, the frame 444 may be coupled with an item conveyor 146, carton conveyor 144, transfer station(s) 150, or other stands or mounting points, so that the diverter mechanism 450 may divert objects.

As illustrated in the example of FIGS. 4D and 4I, the diverter mechanism 450 may include a conveyor belt 480 with paddles 482*a* and 482*b* mounted thereto. The WES 102 or equipment controller(s) 110 may rotate the conveyor belt 480 (also referred to herein as a diverter belt), thereby rotating the paddles 482*a* and 482*b*, which may contact an item and push it sideways into either of two transfer stations 150 (e.g., as illustrated in FIG. 4D). As illustrated in the example of FIGS. 4D, 4E, and 4I, the frame 444 may be open above the conveyor belt 480, so that the paddles 482 may pass completely or partially over the top of the diverter belt 480 without contacting the frame 444. Accordingly, as the diverter belt 480 rotates the paddles 482, they may push items in either direction (e.g., by a front or back surface of the paddle 482) and, in implementations where there are multiple paddles 482, the next paddle 482 may automatically rotate into a position where it is ready to quickly divert a subsequent item from the item conveyor 146. The diverter belt 480 may be coupled with a motor that provides precise and quick positioning and movement of the belt 480 and, thereby, the paddles 482.

The example diverter mechanism 450 is illustrated and described in further detail below, for example, in reference to FIG. 4I-4J. It should be noted that although an example diverter mechanism 450 is illustrated and described, other types of diverters, such as pneumatic or robotic arms, specialized conveyors, movable walls, etc., are possible and contemplated herein.

Figure 4J:
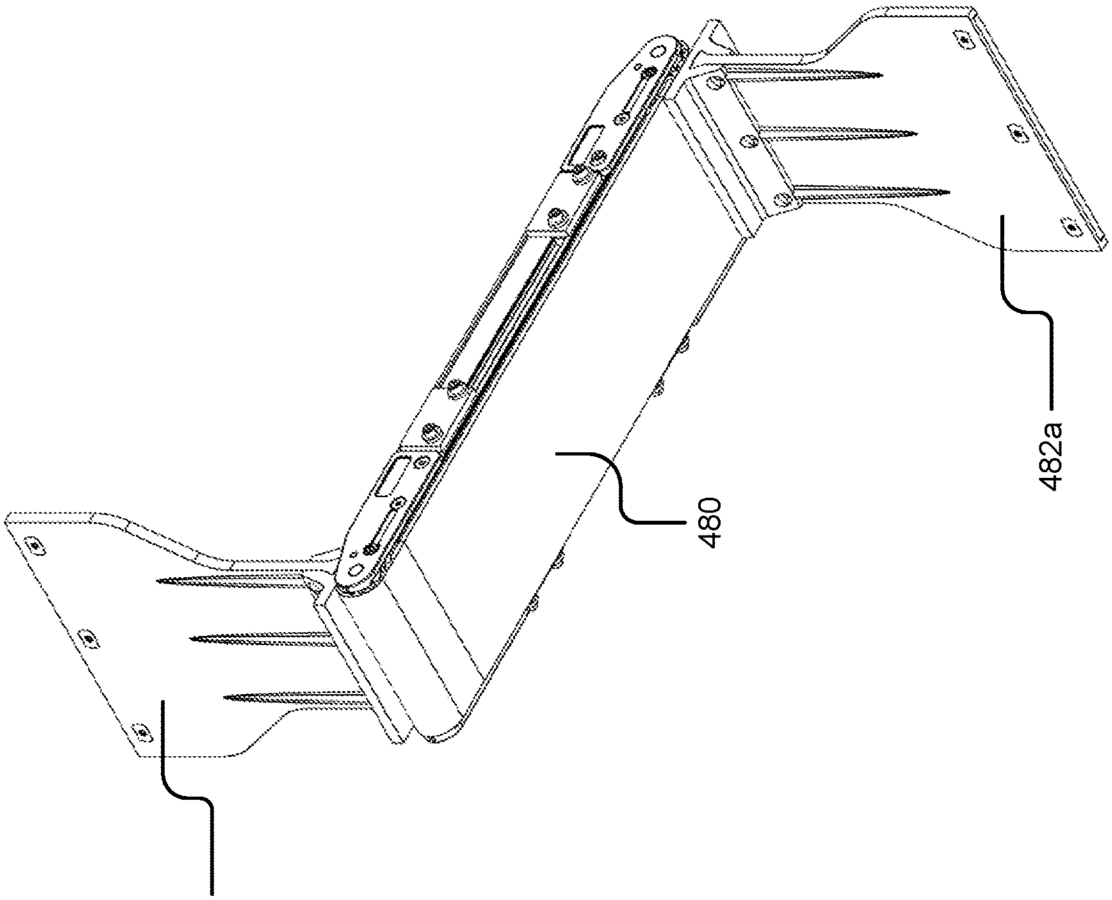
Figure 4K:
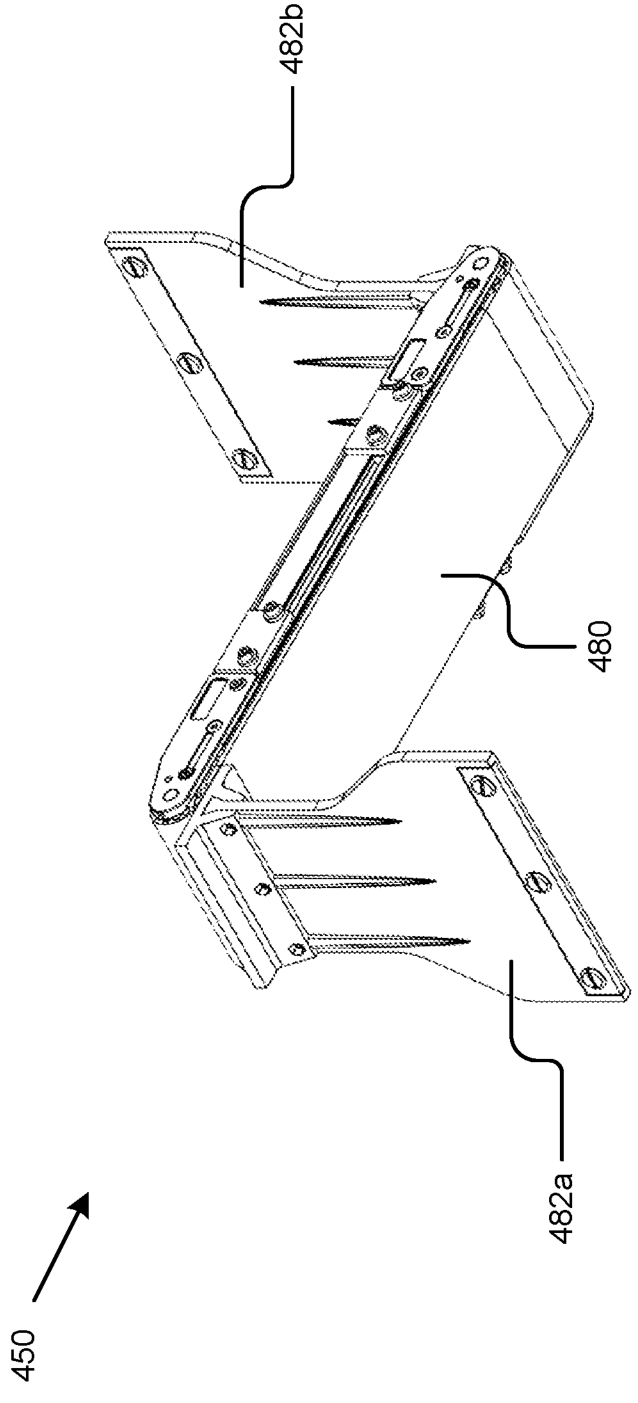

FIGS. 4J and 4K illustrate an example diverter mechanism 450 with a conveyor belt 480 and two paddles 482*a* and 482*b*. FIGS. 4J and 4K omit conveyor motors, mounting mechanisms, and frames to illustrate the diverter conveyor belt 480 and paddles 482 more clearly. The diverter mechanism 450 may physically push items into transfer stations 150, for example, a conveyor belt 480 may translate a surface of a paddle 482 perpendicular to a direction of movement of an item conveyor 146 thereby contacting an item on the item conveyor 146 and moving it horizontally into a transfer station 150.

In some implementations, the diverter mechanism 450 may include one, two, three, or more paddles 482. Each paddle 482 may be attached at an end of the paddle 482 to the diverter belt 480. The paddle 482 may have a width at the connection with the belt to match a width of the belt and a width at an opposing end of the paddle 482, which is wide enough to contact a variety of sizes of items on the item conveyor 146 or based on a variety of speeds at which the items may pass the paddle 482 on the item conveyor 146.

In some implementations, a paddle 482 may include reinforcing grooves, channels, protrusions, walls, corrugations, or other structures, which strengthen the paddle 482 so that it does not deform or break when its surface contacts heavy items.

In some implementations, the diverter mechanism 450 may include or be communicatively coupled (either directly or via equipment controller(s) 110 or the WES 102) with scanners 142 or other sensors that detect items in a loading or diversion area (e.g., an area at which the paddle 482 may contact the item). For example, the sensor may detect a presence of an item, a scanner may identify a specific item, and/or the WES 102 may use an item conveyor 146 position along with sensor/scan data to determine when to divert an item.

The diverter belt 480 may be various types of belts or similar mechanisms. For instance, the belt 480 may be a round wheel or elongated conveyor with paddles 482 attached. The belt 480 may be constructed of rubber, metal, or another material, or may be a chain (e.g., a belt surface may be one or more chains). In some implementations, the belt 480 may include holes into which an end of a paddle 482 may attach (e.g., using fasteners, such as bolts), for example, the holes may include threaded inserts embedded into the belt(s) 480 for receiving fasteners. The diverter belt 480 may include a precise geared drive that moves at a high rate of speed, to move items quickly and accurately for circumstances where the item is continuously or intermittently moving on an item conveyor 146.

The diverter belt 480 may have various lengths or diameters of rotation to accommodate various widths of item conveyors 146. For example, a diverter belt 480 may be a conveyor belt that is mounted upside down above an item conveyor 146. For instance, if an item conveyor 146 is wider or if a consolidation area 426 of a transfer station 150 is farther away, the diverter belt 480 may be longer, so that the paddle 482 moves farther or more flatly (e.g., along a flat side of the diverter belt 480) for a longer distance.

While other types of diverters (e.g., pneumatic pushers, robotic arms, etc.) are possible and contemplated herein, the example implementations of the diverter mechanism 450 described herein provide various benefits. For instance, a pneumatic pusher may push an item across the item conveyor 146 but would then have to retract to reset in order to push a subsequent item in the same direction, which limits a density of objects that can be diverted (e.g., from the item conveyor 146). Accordingly, this improved configuration allows the paddle(s) 482 to automatically reset to push a subsequent item in either direction, thereby substantially increasing throughput and density of items that can be diverted from an item conveyor 146 over traditional diverters.

The example diverter mechanism 450 may allow two items in a row to be transferred from an item conveyor 146 into the same transfer station 150 because, when a first paddle 482*a* moves across the diverter belt 480, a second paddle 482*b* may automatically move into position in order to push a second item in the same direction. For example, as illustrated in the transition from FIG. 4J to FIG. 4K, a first paddle 482*a* may move to the left (in the figures) from the position illustrated in FIG. 4J to the position illustrated in FIG. 4K. At the same time, the diverter belt 480 moves the second paddle 482*b* across the top of the diverter belt 480, accordingly, there is a paddle at both ends of the diverter belt 480, so the diverter mechanism 450 can immediately push an item in either direction by rotating the belt 480.

Figure 5:
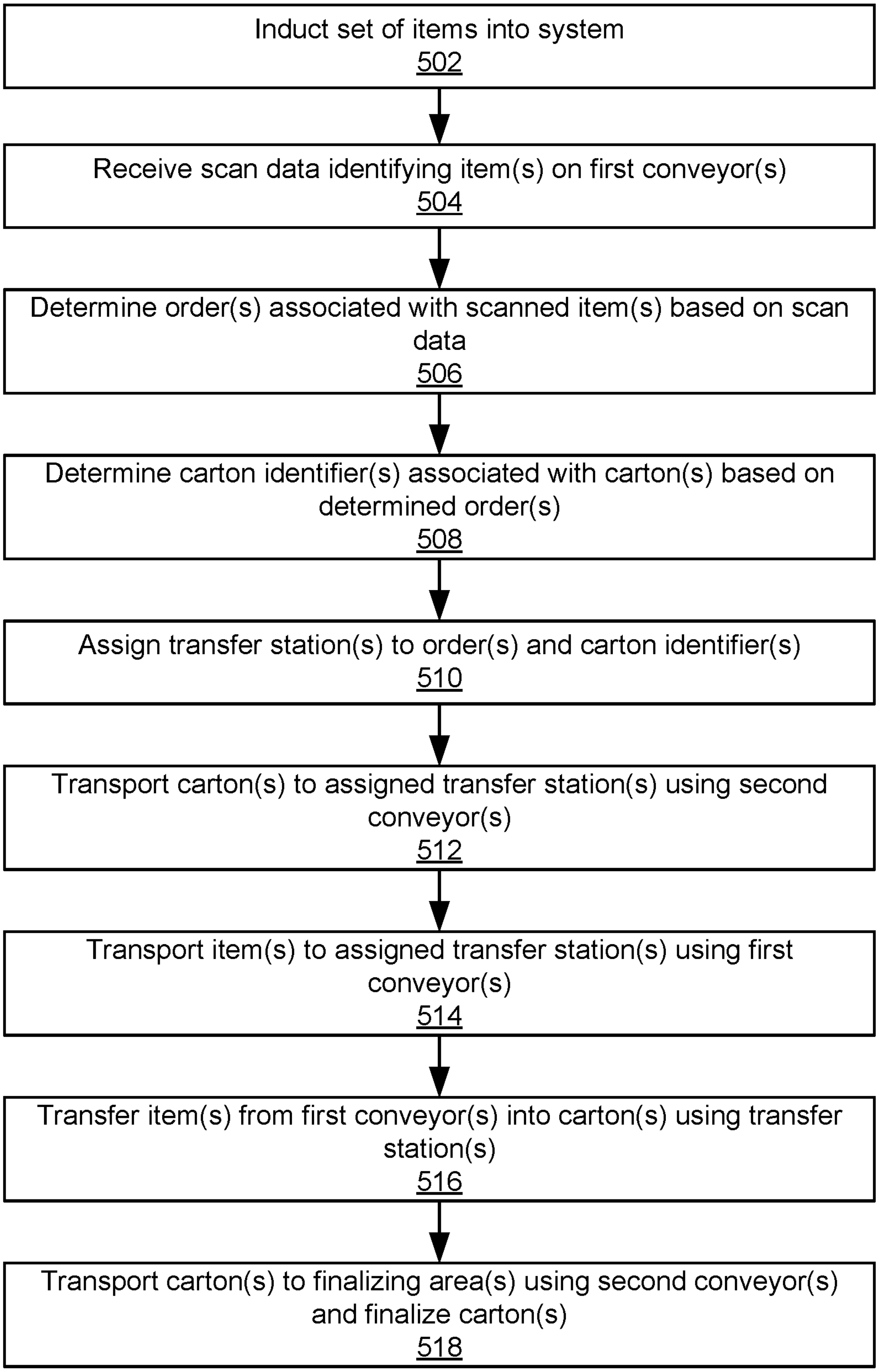
FIG. 5 is a flowchart illustrating an example method for automated sorting and packing of items into cartons.

FIG. 5 is a flowchart illustrating an example method for automated sorting and packing of items, for example, into cartons (e.g., shipping boxes). While example operations of FIG. 5 are described in reference to sorting a single item, the same operations may be used to sort multiple items of multiple orders. The operations and features described in reference to FIGS. 5, 6, and 7 may be interchanged, modified, omitted, or augmented without departing from the scope of this disclosure. Additionally, it should be noted that the operations of the methods described in reference to FIGS. 5, 6, and 7 may use some, all, or none of the mechanisms described in reference to the other figures described herein. It should also be noted that the operations are described in reference to the WES 102, although some or all of them may be performed by the equipment controller(s) 110 independently or via communication with the WES 102.

At 502, the WES 102 may induct a set of items into the automated sorting and packing system. The WMS 104 may receive a set of orders including order data describing items, which it may communicate with or provide access to the WES 102. The WES 102 may receive order data and/or may select orders for a batch container and/or picking using the sorting system. The WES 102 may also instruct items to be placed on an item conveyor 146. Example details for inducting items are described in further detail in reference to FIG. 7.

At 504, the WES 102 may receive scan data identifying item(s) on one or more item conveyor(s) 146. As noted above, items and cartons may be conveyed using the same or separate conveyors. In some implementations, the WES 102 may receive scan data from a scanner 142 adjacent to an item conveyor 146, which identifies the item. For example, the scan data may identify a batch container holding an item and/or the item itself, as described above. For instance, the WES 102 may instruct an item conveyor 146 to move thereby transporting an item through a scan tunnel 250.

The WES 102 may compare the scan data with a database of item attributes, such as barcode, QR code, visual aspects, logos, or other data and, based on the comparison, identify the item. For instance, the WES 102 may identify a UPC code on an item, which identifies the item. The equipment controller(s) 110 may receive the scanned data from the scan tunnel 250 and transmit it to the WES 102, which may retrieve data from a database and determine a corresponding carton configuration (e.g., based on size, etc.). The WES 102 may transmit item, sorting, transfer station, carton, or other data to the equipment controller(s) 110, as described below.

At 506, the WES 102 may determine one or more order(s) associated with scanned item(s) based on scan data. For instance, the WES 102 may determine an order that includes the item based on order data. In some implementations, such as where a batch container includes a set of items for a corresponding set of orders, the WES 102 may determine the order (e.g., including multiple items) from the set of orders.

At 508, the WES 102 may determine carton identifier(s) associated with carton(s) based on determined order(s). Depending on the implementation, the WES 102 may determine a certain carton for the order based on a quantity of items in the order and/or the size, shape, or other attributes of the items. For example, the WES 102 may select a carton size, issue an instruction to a corresponding case erector 252 to erect a carton, and/or apply a label with a carton identifier or LPN to the carton. In instances where a carton is already in the system (e.g., on a carton conveyor 144) but not yet assigned to an order, the WES 102 may determine the LPN of the carton or apply an LPN (e.g., on a label or printed on the carton) to the carton and associate the LPN with the order containing the item.

At 510, the WES 102 may assign transfer station(s) 150 to the order(s) and/or the carton identifier(s). For instance, based on receiving the scan data identifying the item, the WES 102 may assign a transfer station 150 from among a plurality of transfer stations 150 to the item and corresponding order. Similarly, the WES 102 may assign the transfer station 150 to a carton having the dimensions or LPN.

Depending on the implementation, if a scanned item belongs to an order that has already been assigned to a transfer station 150, the WES 102 may assign the same transfer station 150 to the item, so that the items in the order are conveyed to the same transfer station 150 and carton.

The transfer station 150 may be assigned based on various factors, such as availability among transfer stations 150, presence or size of a carton already in a transfer station 150, size or configuration of transfer station 150 (e.g., to match a size or quantity of items in an order), proximity to other transfer stations 150 assigned to other orders. For example, the WES 102 may use various assignment schemes, such as assigning transfer stations 150 on a first side working from an end of the item conveyor 146 near a finalizing area 214 to an end near a scan tunnel 250 and then moving to the other transfer station(s) on the other side of the conveyor(s), or the WES 102 may assign alternating transfer stations 150 to sequential items on the item conveyor 146 to reduce odds of sorting or diverting traffic issues.

At 512, the WES 102 may transport carton(s) to the assigned transfer station(s) 150, for example, using carton conveyors 144 or other means, as described elsewhere herein. For instance, the WES 102 may issue an instruction to a case erector 252 to erect a shipping carton (e.g., a cardboard shipping box), which may be placed by the case erector 252, a robot, or a human agent onto a carton conveyor 144. The WES 102 may also instruct a label applicator or human agent to apply a label representing an assigned LPN to the carton. Additionally or alternatively, a scanner 142 may scan an LPN and associate it for a carton already on carton conveyor 144.

The WES 102 may instruct the carton conveyor(s) 144 to transport the carton to an assigned transfer station 150. As illustrated in FIG. 2, the carton conveyor(s) 144*a* and 144*c* may convey the carton to a carton-receiving area 322 of the assigned transfer station 150*b*, for example, responsive to receiving a scan of a batch container and/or of an item in an associated order.

For example, the equipment controller(s) 110 may release a carton size provided by the WES 102 to a carton erector that may erect the carton. A scanner 142 along the carton conveyor 144 may scan an LPN on a carton on a carton conveyor 144 lane and determine an association of that LPN with an order. The carton conveyor 144 may convey the carton to the assigned transfer station 150 and divert the carton into a carton-receiving area 322 of the assigned transfer station 150 using a diverter, diverter mechanism 450, angled rollers of the carton conveyor 144, a pneumatic pusher, or other mechanism.

In some implementations, when a carton of appropriate dimensions or configuration is already in a transfer station 150 (e.g., having been previously transported to the transfer station 150), the WES 102 may assign the carton, LPN, and/or transfer station 150 based on the presence of the unassigned carton.

Figure 6:
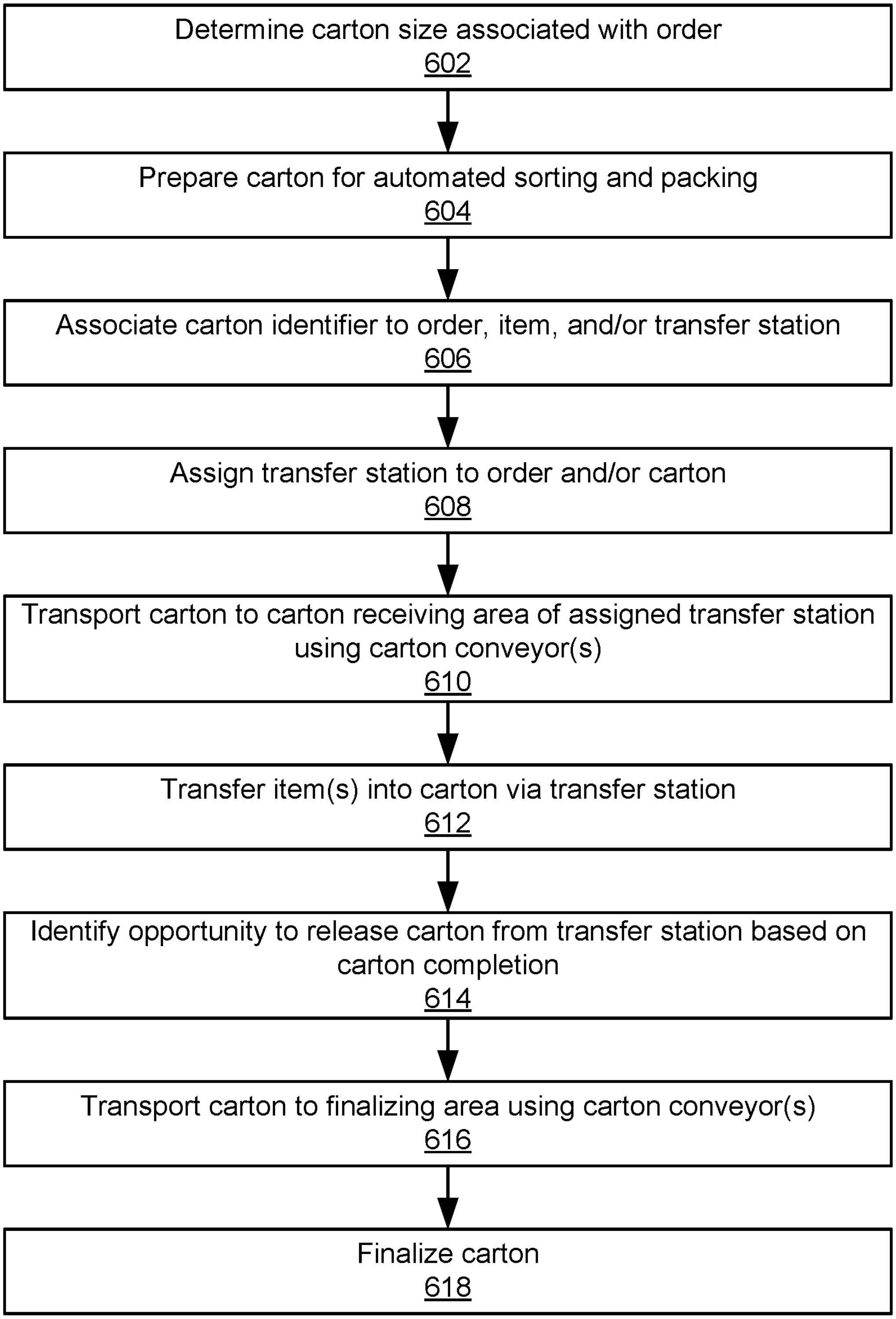
FIG. 6 is a flowchart of an example method of sorting cartons.

Additional details for preparing and sorting cartons are described in further detail elsewhere herein, for example, in reference to FIG. 6.

At 514, the WES 102 may transport one or more item(s) to the assigned transfer station(s) 150 using conveyor(s), such as the item conveyors 146 described above. For example, the item conveyors 146 may convey the items before, after, or in a parallel with cartons, which are also being conveyed on the same or different conveyors (e.g., on carton conveyors 144, by AGVs 114, etc.). The WES 102 or equipment controller(s) 110 may determine when an item is at the assigned station based on a position of the item conveyor(s) 146, a scan of the item, a sensor (e.g., a weight or optical presence sensor) indicating that an item is at the transfer station 150, or other means. When it is determined that the item is at the assigned transfer station 150, for example, next to a chute 428 and/or consolidation area 426 of the transfer station 150, the WES 102 or equipment controller(s) 110 may issue an instruction to a diverter or other mechanism to move the item onto the chute 428 or consolidation area 426, for example, by rotating a diverter belt 480 of the diverter mechanism 450.

In instances where there are additional items assigned to the transfer station 150 or order, these items may also be transferred into the transfer station 150 as they arrive via the item conveyor(s) 146. Similarly, where other items from other orders are also in the sorting and packing system, they may also be transported and diverted into their respective assigned transfer stations 150.

At 516, the WES 102 may transfer item(s) from conveyor(s) into carton(s) using transfer station(s) 150. For instance, as noted above, the items may be diverted from an item conveyor 146 onto a chute 428 or consolidation area 426 of the assigned transfer station 150. In some implementations, the item may be held in a consolidation area 426 by a door of the consolidation area 426 and released later based on a trigger from the WES 102 or equipment controller(s) 110. In some implementations, when the item is moved onto a chute 428 or otherwise into a transfer station 150, it may be moved directly into the carton, for example, using gravity through a chute 428 or opening 434, using a robotic arm, using a diverter, or other mechanism of a transfer station 150.

In some implementations, some or all of the items from an order may be held in the consolidation area 426 of a transfer station 150, for example, until all of the items of an order are in the consolidation area 426, until a carton is positioned in the carton-receiving area 322 of the transfer station 150, and/or based on another condition. When the condition is satisfied the WES 102 may issue an instruction to transfer the items into the carton using the transfer station 150, for example, by opening the door mechanism(s) of the transfer-station table 460, as described above. Because a consolidation area 426 may hold items from an order until a carton is situated in the transfer station 150, the items may be transported before, after, or in parallel with the carton. For instance, the WES 102 may, based on availability, conveyor speed, or other factors, coordinate the arrival of the items and associated carton to increase throughput.

Figure 7:
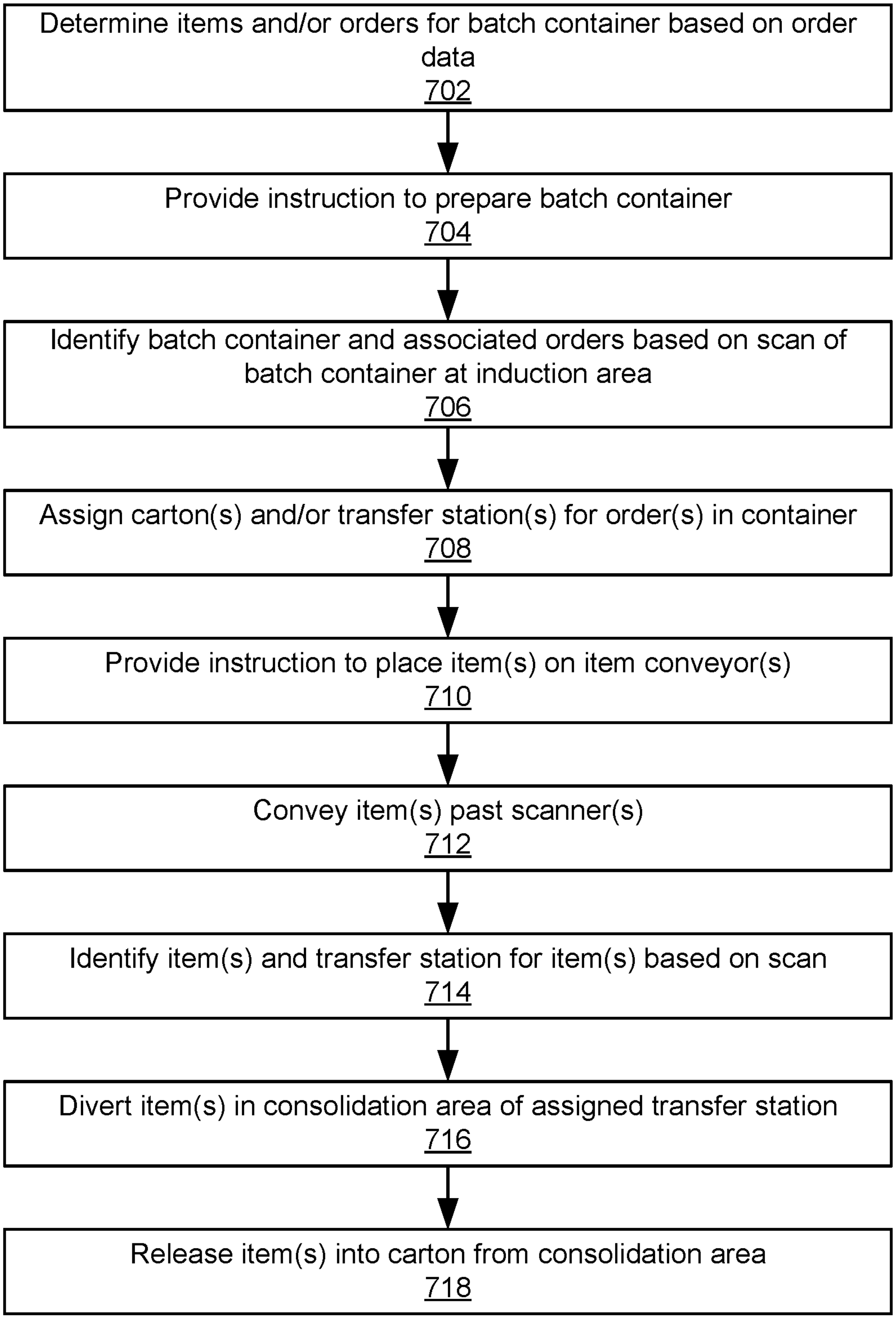
FIG. 7 is a flowchart of an example method of sorting items.

Additional details for transporting and transferring items are described in further detail elsewhere herein, for example, in reference to FIG. 7.

At 518, the WES 102 may transport carton(s) to finalizing area 214(*s*), for example using the carton conveyor(s) 144. The WES 102 may also finalize the carton(s) at the finalizing area 214(*s*). For instance, responsive to determining that one or more defined conditions have been satisfied, the WES 102 may instruct the transfer station 150, the carton conveyor 144, and/or another mechanism to transfer the carton onto a carton conveyor 144 and convey the carton from the transfer station 150, for example, to a finalizing station in a finalizing area 214. The WES 102 may actuate a motor to divert the carton onto a takeaway lane of the carton conveyor(s) 144, where the carton may be scanned and a corresponding shipping label be applied for the order. The defined condition may include that the item has been transferred into the carton, that all items from an order have been successfully transferred into the carton, that there is an availability on the carton conveyor 144 (e.g., that there is an open space or availability on the transport equipment/carton conveyor 144), and/or another condition, such as an exception or error condition. It should be noted that other means of moving the carton from the transfer station 150, such as using an AGV 114, human agent, robot, or another device, are possible and contemplated.

In some instances, there may be multiple carton conveyor 144 lanes separating into various finalizing stations or areas. The WES 102 may select a carton conveyor 144 lane and/or finalizing station based on various factors, such as capability, throughput, availability, shipping location, or other factors.

In some implementations, such as when a batch container includes more orders than there are transfer stations 150, multiple orders may be packed into a single carton. The WES 102 may flag the LPN in computer memory as including multiple orders, the items from the orders may be sorted into the carton using an assigned transfer station 150, and the orders may be separated into separate cartons the finalizing area 214.

In some implementations, the carton conveyor(s) 144 may transport the carton to a transfer area at which the carton is completed, for example, by printing and placing a packing slip, performing a quality control check, printing and applying a shipping label, and/or closing the carton. For example, the LPN of the carton may be scanned at a finalizing station of the finalizing area 214 and, based on the scan data, the WES 102 may identify the carton, corresponding order, and shipping address and may automatically print corresponding ads, packing materials, packing slips, and/or shipping labels. Although using an LPN that is distinct from a shipping label allows flexibility and error correction, it should be noted that, in some implementations, a shipping label may be applied as part of or in place of the LPN above.

For example, a scanner 142 may scan the carton on a carton conveyor 144 and send scan data to equipment controller(s) 110, which transmit the data to the WES 102, which, in turn, correlates the scanned LPN with an order. The WES 102 may transmit order data to the WMS 104, which may determine and transmit the shipping label corresponding to the order to an automated label printer and/or applicator along a carton conveyor 144 in the finalizing area 214. In some implementations, the label applicator may print and/or apply the shipping label to the scanned carton and the human interface system 108 may issue an instruction to a human agent to ensure the carton is packed properly.

In some implementations, the WES 102 may transmit (e.g., based on a scan of the LPN) an instruction to the human interface system 108 displaying instructions to a human agent to check the contents of the carton, insert materials, apply a shipping label, and/or close the carton.

In some implementations, although not shown in FIG. 5, the WES 102 may detect exceptions or errors in items and/or cartons in the automated sorting and packing system. For instance, if a carton does not receive all of the items assigned to it, it may remain in the transfer station 150 and/or be transferred to a jackpot or exception area 206. If an item does not successfully divert into a transfer station 150 or is not read properly by the scanner(s) 142, the item may remain on the item conveyor 146 and be conveyed to the end of the item sorter where it drops into a jackpot or exception area (e.g., a bin at the end of the item conveyor 146 from which a human agent can manually address errors). Other exception or error-mitigation processes may also be automatically or manually implemented.

FIG. 6 is a flowchart of an example method of sorting cartons, for example, using the automated sorting and packing system. As noted above, the operations of the method described in reference to FIG. 6 may be combined with other operations and features herein and may be performed using communication between various systems and mechanisms described, for instance, in reference to FIGS. 1 and 2. For example, the equipment controller(s) 110 may transmit a data string (e.g., representing scan data) to the WES 102, which performs processing and sends a signal to the equipment controller(s) 110, which, in turn, control equipment (e.g., conveyors, diverters, etc.) based on the signal.

At 602, the WES 102 may determine a carton size associated with an order. For instance, the WES 102 may select from a set of available carton sizes (e.g., based on those cartons in the system, cartons that can be constructed by available case erectors 252, etc.) for an identified order. The carton size may be based on a quantity, size, and/or shapes of items, for example, using cubing, total volume, or other methods of determining carton size.

At 604, the WES 102 may prepare a carton for automated sorting and packing. For example, the WES 102 may send an instruction indicating to erect the carton, apply, assign, or associate an LPN, place the carton on a carton conveyor 144, place the carton in a transfer station 150, or perform an operation.

In some implementations, the WES 102 may send an instruction to a case erector 252 corresponding to the determined size, and the case erector 252 may prepare a corresponding carton. Additionally or alternatively, the WES 102 may instruct a carton of the corresponding size to be placed on a carton conveyor 144 and/or transported to a transfer station 150. For instance, a first case erector 252 may erect small cartons and a second case erector 252 may erect large cartons.

The case erector 252 or label applicator may apply (e.g., by printing on the carton or applying a sticker) an LPN to the carton. In some implementations, the WES 102 may assign or associate an LPN to the carton, as described below.

At 606, the WES 102 may associate a carton identifier (e.g., an LPN) to the order, item, and/or transfer station 150. The carton identifier or LPN may be a bar code, QR code, number, symbol, or RF ID tag, etc., as noted above. For instance, the WES 102 may apply an LPN to a carton (e.g., using an automated label applicator and/or sending an instruction to a human interface system 108 instructing a human agent) and associate the LPN with the order, carton, item, and/or transfer station 150. For example, after a carton has been erected, a QR code representing an LPN may be applied to the carton, and the carton may be placed on the carton conveyor(s) 144, transported, sorted, and finalized.

In some implementations, the WES 102 may receive scan data identifying an LPN on the carton. The WES 102 may then associate, in memory accessible to the WES 102 or other components of the system 100, the carton identifier/

LPN with the carton and the order, item, and/or transfer station 150, if already assigned to the carton or order.

The LPN allows the carton to be identified and tracked throughout the automated sorting and packing system, for example, whether at induction 208, on carton conveyors 144, in transfer stations 150, in a jackpot area 206, or in a finalizing area 214. For instance, the LPN may be used to transport the correct carton to the correct transfer station 150.

At 608, the WES 102 may assign a transfer station 150 to the order, carton, and/or carton identifier. For example, as described above, a transfer station 150 may be assigned based on attributes of the transfer station 150, availability of the transfer station 150, proximity to an item or carton, defined order of assignment, or another factor.

At 610, the WES 102 may transport the carton to a carton-receiving area 322 of the assigned transfer station 150 using carton conveyor(s) 144 or other means. For example, the WES 102 may automatically transport the carton from a case erector 252 to a carton-receiving area 322 of the assigned transfer station 150 via one or more carton conveyor(s) 144 using the carton identifier/LPN. The carton conveyor(s) 144 may be located partially underneath one or the item conveyor(s) 146, for example, when proximate to the assigned transfer station 150.

Depending on the implementation the carton-receiving area 322 may be below a transfer station consolidation area 426 of a transfer station 150, as described above. For example, the carton conveyor(s) 144, transfer station 150, or other mechanisms, may align the carton to an edge under a door and/or chute guide of a consolidation area 426. The chute guide may be an opening closed by a door in a transfer-station table 460/consolidation area 426, an exit of a chute, or walls/guides of transfer station door(s) (e.g., 466), as described in further detail above (e.g., in reference to FIGS. 4B-4H). For example, the carton may be aligned to an edge or hard stop of a carton-receiving area 322 under a trap door through which items may pass.

At 612, the WES 102 may transfer one or more item(s) of the order into the carton via the transfer station 150. In instances where the carton arrives at the transfer station 150 before one or more items of the associated order, the carton may wait at the transfer station 150 for one or more items to be transferred into the carton, for example, one at a time, in a group, or all together after being consolidated in the consolidation area 426 of the transfer station 150. For example, the door mechanism(s) of the transfer station 150 may open, thereby allowing the item(s) of the order to fall into the carton. In some instances, the carton conveyor(s) 144 may move more quickly than one or more item conveyor(s) 146, so that a carton may arrive at an assigned transfer station 150 sooner than an item arrives at the assigned transfer station 150.

The WES 102 may determine completion a transfer to a carton, for example, such as by determining that the item(s) have been successfully transferred into the carton by the transfer station 150. For instance, the WES 102 and/or equipment controller(s) 110 may determine that a door member 464 has opened. In some implementations, the transfer station 150 may include a sensor (e.g., a weight sensor, optical sensor, etc.) that detects an item in a consolidation area 426 after the door member 464 has opened, in which case, the transfer station 150 may send an error message, for example, to the WES 102.

At 614, the WES 102 may identify an opportunity to release the carton from the transfer station 150, for example, based on carton completion. The WES 102 and/or equipment controller(s) 110 may identify a space or capacity on a carton conveyor 144 and transfer the carton from the carton-receiving area 322 of the transfer station 150 to the carton conveyor 144. Depending on the implementation, the carton conveyor 144 may be the same or a different carton conveyor 144 that brought the carton the transfer station 150. For example, based on a position of cartons on a carton conveyor 144, the equipment controller(s) 110 may identify an empty space next to the transfer station 150 that is large enough for the carton, the equipment controller(s) 110 may transfer the carton onto the carton conveyor 144, as described above. In some instances, the equipment controller(s) 110 may stop the carton conveyor 144 and/or cartons on the carton conveyors 144 when transferring the carton onto the carton conveyor 144. In some implementations, a conveyor, motorized rollers, a mechanical arm, a pneumatic pusher, diverter mechanism 450, or other device may transfer the carton to/from the carton conveyor 144, as discussed above.

At 616, the WES 102 may transport the carton to finalizing area 214 using carton conveyor(s) 144. For example, the carton may be assigned to a certain carton conveyor 144 lane leading to a certain finalizing area 214 and/or finalizing station in the finalizing area 214, as discussed above. The WES 102 and/or equipment controller(s) 110 may use a known location of the carton on the carton conveyors 144, scans of the LPN on the carton, or other sensors to determine and track the carton during transportation to the finalizing area 214.

At 618, the WES 102 may finalize the carton (e.g., at a finalizing area 214), which may include scanning the LPN of the carton, identifying the carton and corresponding order based on the LPN, and performing operations, such as applying a shipping label to the carton, performing a quality control check, and/or performing other operations, as described in further detail above.

FIG. 7 is a flowchart of an example method of sorting items using the automated sorting and packing system. For example, the method of FIG. 7 may sort items into specific cartons using conveyors and transfer stations 150.

At 702, the WES 102 may determine items and/or orders for a batch container based on order data. For instance, the WMS 104 and/or WES 102 may receive order data for orders to be fulfilled in a fulfillment center. Depending on the implementation, the WES 102 may determine a set of orders with items that may be packed using the automated sorting and packing system described herein, such as those orders with defined eligible items, certain quantities of items (e.g., few enough to fit into a consolidation area 426), orders that use defined box sizes, orders with certain priorities, or based on other criteria. Accordingly, the WES 102 may select a set of orders and/or items for a picking session or batch. The quantity of orders or items in the set of orders may be based on capacity and/or throughput of the item conveyor(s) 146 and/or sorting system.

At 704, the WES 102 may provide one or more instructions to prepare a batch container/set of orders. For example, the WES 102 may instruct a human agent or AGV 114 to retrieve items for the set of orders into one or more batch containers, which are brought to an induction point for one or more item conveyors 146, such as before a scan tunnel 250, as described in reference to the example of FIG. 2.

For example, the WES 102 may identify an opportunity to pick the set of orders at an efficient time (e.g., at a time when equipment is available), transmit picks for the orders to the human interface system 108 or REX server 118, which may instruct a human agent and/or AGV 114 to pick the items for the orders from storage and bring them to an induction point of the item conveyor(s) 146. Although the batch container is described as items being transported in a container or tote, the items may be in multiple containers, on a cart, on a shelving unit, or other device that transports the items to the induction point.

In some implementations, the batch container may be transported to an induction point using a conveyor, AGV 114, or another means.

At 706, the WES 102 may identify a batch container and associated orders, for example, based on a scan of the batch container at an induction area 208. For instance, a scanner 142 (e.g., scanner 142*a* or 142*b* in FIG. 2) at the induction area 208 may receive scan data scanning a batch container identifier, which may be a QR code, barcode, RF ID tag, or other identifier, which may identify the particular container. Based on the scan data, the WES 102 may identify the set(s) of items and set of orders in the batch container(s).

At 708, the WES 102 may assign one or more carton(s) and/or transfer station(s) 150 for the order(s) in the batch container(s). For instance, the WES 102 may assign a transfer station 150 to each of the orders.

In some implementations, the WES 102 may also assign a carton and/or carton identifier/LPN to the order. For instance, the WES 102 may prepare and/or transport the carton to the assigned transfer station 150, as described in reference to FIG. 6. For example, the WES 102 may, using the carton sortation operations and mechanisms described above, transport the plurality of cartons to the corresponding plurality of transfer stations 150 using carton conveyors 144 responsive to receiving the scan data identifying the batch container(s). Depending on the implementation, the carton may be prepared and/or transferred to the assigned transfer station 150 when the batch container is scanned, when the item(s) are scanned by scan tunnel 250, or at another defined time.

At 710, the WES 102 may provide an instruction to place the item(s) on item conveyor(s) 146. For example, the WES 102 may transmit an instruction, via the human interface system 108 to a computing device of a human agent instructing the human agent or the robot to place the items one by one onto an item conveyor 146 (e.g., an induction conveyor that conveys the item through a scan tunnel 250). In some implementations, the item conveyor 146 may have divisions or induction zones, as discussed above, which space out the items for more accurate scanning and/or diversion into transfer stations 150. For instance, the item conveyor 146 may have painted lines that are spaced at defined intervals that help the agent to place the product at a defined spacing.

At 712, the WES 102 or equipment controller(s) 110 may convey item(s) past scanner(s) 142. For example, the equipment controller(s) 110 may instruct an item conveyor 146 to move, thereby transporting the items past the scanners 142, which may be held in a scan tunnel 250 to scan multiple angles of the item(s), as described in the example implementations above. The scanner(s) 142 may transmit scan data directly or via the equipment controller(s) 110 to the WES 102.

At 714, the WES 102 may identify the items and assigned transfer station 150 for the item(s) based on scan data. For instance, the WES 102 may identify visual attributes, UPC code, barcode, RF ID tag, or other attributes of an item and use the attributes to identify the item. The WES 102 may identify an order corresponding to the scanned item. The WES 102 may also identify or assign a transfer station 150, carton, and/or carton identifier/LPN associated with the order/item.

The WES 102 may identify the item (e.g., a certain SKU or stock keeping unit) by matching the UPC or other attribute against a database of item attributes. In some implementations, in order to improve identification accuracy, the WES 102 may match the scan data against attributes of the set of items in the scanned batch container to select from the set of items.

At 716, the WES 102 may divert the scanned item(s) in the consolidation area 426 of the assigned transfer station 150. The WES 102 and/or equipment controller(s) 110 may use one or more item conveyors 146, scanners 142, sensors, and diverters to move the item along a path to the assigned transfer station 150. For instance, the item conveyors 146 may have various paths or lanes to one or multiple transfer stations 150. The WES 102 and/or equipment controller(s) 110 may track (e.g., using a scan and/or a position of the item conveyor(s) 146) the item and transport it to the assigned transfer station 150. In some instances, the equipment controller(s) 110 may determine that the item is at a loading point for the assigned transfer station 150 and, in response, divert the item into a consolidation area 426 of the assigned transfer station 150. For example, the equipment controller(s) 110 may actuate a diverter, such as the diverter mechanism 450 to divert the item from the item conveyor 146 into the consolidation area 426.

For example, an item conveyor 146 may have a cleated belt with a zone for each item. The item conveyor 146 may move the item forward until it reaches an assigned transfer station 150. In some instances, without stopping the item conveyor 146, a diverter mechanism 450 may turn in a direction toward the assigned transfer station 150 to push the item onto a chute 428 of the consolidation station. The item may slide down the chute and rest against a door of the consolidation area of the transfer station 150. A sensor or scanner 142 communicatively coupled with the equipment controller(s) 110 may confirm that the item has successfully transitioned from the item conveyor 146 into the transfer station 150. The equipment controller(s) 110 may transmit data to the WES 102 confirming that the item was successfully diverted, and the WES 102 may remove the item from a list of items to be sorted for an order. This process may be repeated until the order list for the order associated with the transfer station 150 is empty or the order is otherwise completed.

At 718, the WES 102 may release the item(s) into a carton in the transfer station 150 from the consolidation area 426. For instance, the WES 102 may determine that a set of items assigned to the transfer station 150 has been diverted into its consolidation area 426 and that a corresponding carton is in a carton-receiving area 322 of the transfer station 150. Responsive to determining that these or other defined conditions are satisfied, the equipment controller(s) 110 may issue an instruction to an actuator in the transfer station 150 causing a door from a chute 428 of the transfer station 150 to open thereby transferring the set of items from the consolidation area 426 into the carton, for example, by allowing the items to drop into the carton. It should be noted that while these operations may use the example transfer station 150 described above, in other implementations, the transfer of items may use other diverters, other transfer station 150 configurations, robotic arms, or other devices.

In some implementations, if an item is not scanned properly, is not diverted properly, or if there is another error, it may be transported into a jackpot or exception area 206 at the end of an item conveyor 146 where it is manually packed into a carton, rescanned, replaced on the item conveyor 146, or another mitigation operation is performed, for example, by a human agent.

Figure 8:
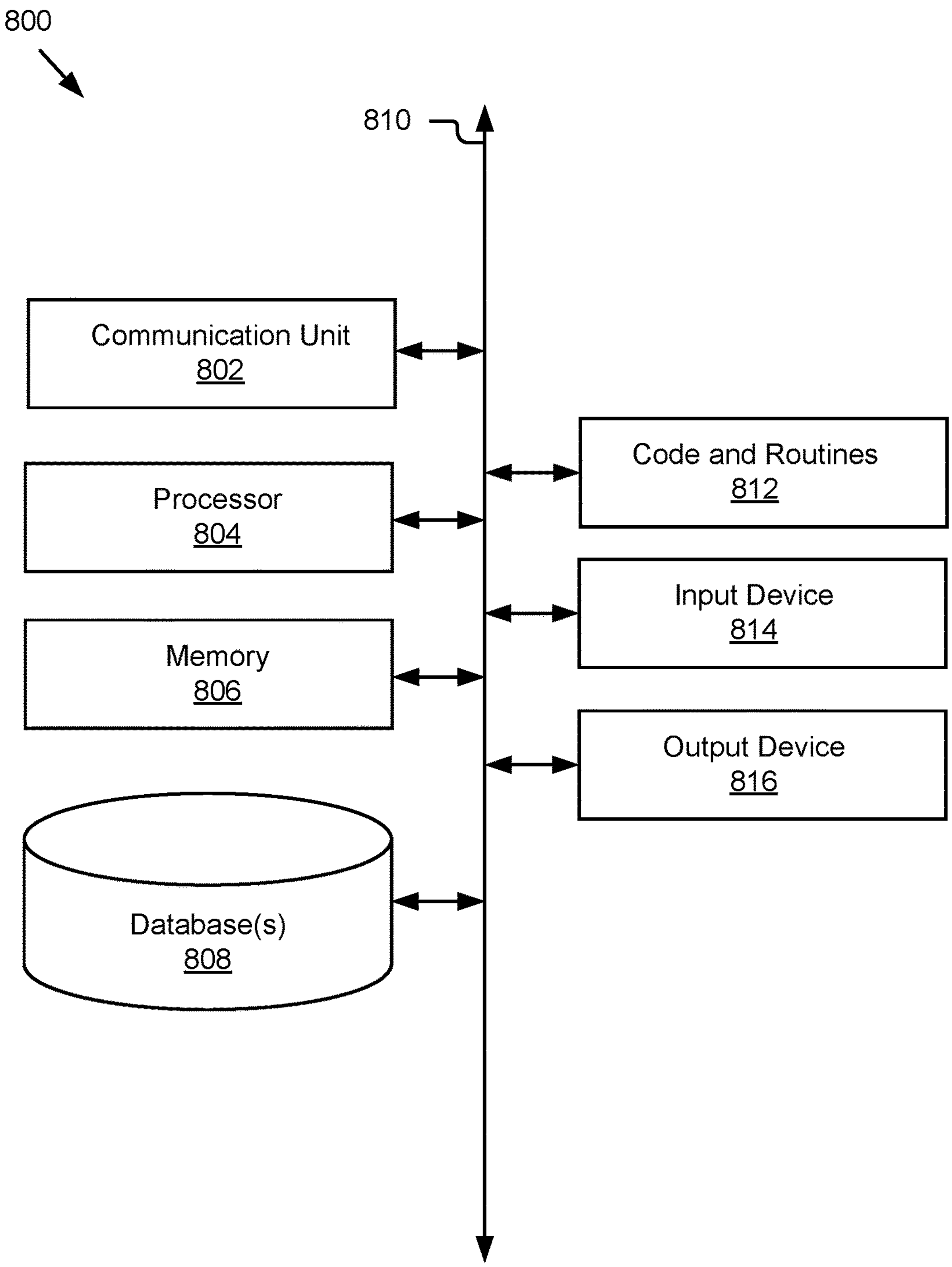
FIG. 8 is a block diagram illustrating an example computing system.

FIG. 8 is a block diagram illustrating an example computing system 800. The example computing system 800 may correspond to a WES 102, a WMS 104, a dispatch system 106, a human interface system 108, equipment controller(s) 110, REX 118, a client device, or other component of the system 100, for example.

The code and routines 812 may include computer logic executable by the processor 804 on a computing system 800 to provide for the functionality described in reference to one or more of the components of the system 100. For instance, in some implementations, the code and routines may include one or more of the components of the WES 102 or equipment controller(s) 110.

As depicted, the computing system 800 may include a processor 804, a memory 806, a communication unit 802, an output device 816, an input device 814, and database(s) 808, which may be communicatively coupled by a communication bus 810. The computing system 800 depicted in FIG. 8 is provided by way of example and it should be understood that it may take other forms and include additional or fewer components without departing from the scope of the present disclosure. For instance, various components of the computing devices may be coupled for communication using a variety of communication protocols and/or technologies including, for instance, communication buses, software communication mechanisms, computer networks, etc. While not shown, the computing system 800 may include various operating systems, sensors, additional processors, and other physical configurations. Although, for purposes of clarity, FIG. 8 only shows a single processor 804, memory 806, communication unit 802, etc., it should be understood that the computing system 800 may include a plurality of one or more of these components.

The processor 804 may execute software instructions by performing various input, logical, and/or mathematical operations. The processor 804 may have various computing architectures to process data signals including, for example, a complex instruction set computer (CISC) architecture, a reduced instruction set computer (RISC) architecture, and/or an architecture implementing a combination of instruction sets. The processor 804 may be physical and/or virtual, and may include a single core or plurality of processing units and/or cores. In some implementations, the processor 804 may be capable of generating and providing electronic display signals to a display device, supporting the display of images, capturing and transmitting images, performing complex tasks including various types of feature extraction and sampling, etc. In some implementations, the processor 804 may be coupled to the memory 806 via the bus 810 to access data and instructions therefrom and store data therein. The bus 810 may couple the processor 804 to the other components of the computing system 800 including, for example, the memory 806, the communication unit 802, the input device 814, the output device 816, and the database(s) 808.

The memory 806 may store and provide access to data to the other components of the computing system 800. The memory 806 may be included in a single computing device or a plurality of computing devices. In some implementations, the memory 806 may store instructions and/or data that may be executed by the processor 804. For example, the memory 806 may store the code and routines 812. The memory 806 is also capable of storing other instructions and data, including, for example, an operating system, hardware drivers, other software applications, databases, etc. The memory 806 may be coupled to the bus 810 for communication with the processor 804 and the other components of computing system 800.

The memory 806 may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor 804. In some implementations, the memory 806 may include one or more of volatile memory and non-volatile memory (e.g., RAM, ROM, hard disk, optical disk, etc.). It should be understood that the memory 806 may be a single device or may include multiple types of devices and configurations.

The bus 810 can include a communication bus for transferring data between components of a computing device or between computing devices, a network bus system including a network or portions thereof, a processor mesh, a combination thereof, etc. The software communication mechanism can include and/or facilitate, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 802 may include one or more interface devices (I/F) for wired and wireless connectivity among the components of the system 100. For instance, the communication unit 802 may include various types known connectivity and interface options. The communication unit 802 may be coupled to the other components of the computing system 800 via the bus 810. The communication unit 802 may be electronically communicatively coupled to a network (e.g., wiredly, wirelessly, etc.). In some implementations, the communication unit 802 can link the processor 804 to a network, which may in turn be coupled to other processing systems. The communication unit 802 can provide other connections to a network and to other entities of the system 100 800 using various standard communication protocols.

The input device 814 may include any device for inputting information into the computing system 800. In some implementations, the input device 814 may include one or more peripheral devices. For example, the input device 814 may include a keyboard, a pointing device, microphone, an image/video capture device (e.g., camera), a touch-screen display integrated with the output device 816, etc.

The output device 816 may be any device capable of outputting information from the computing system 800. The output device 816 may include one or more of a display (LCD, OLED, etc.), a printer, a 3D printer, a haptic device, audio reproduction device, touch-screen display, etc. In some implementations, the output device is a display which may display electronic images and data output by the computing system 800 for presentation to a user, such as a picker or associate in the order fulfillment center. In some implementations, the computing system 800 may include a graphics adapter (not shown) for rendering and outputting the images and data for presentation on output device 816. The graphics adapter (not shown) may be a separate processing device including a separate processor and memory (not shown) or may be integrated with the processor 804 and memory 806.

The database(s) are information source(s) for storing and providing access to data. The data stored by the database(s) 808 may be organized and queried using various criteria including any type of data stored by them, such as the data in the data store 120 and other data discussed herein. The database(s) 808 may include file systems, data tables, documents, databases, or other organized collections of data. Examples of the types of data stored by the database(s) 808 may include the data described herein, for example, in reference to the data store 120.

The database(s) 808 may be included in the computing system 800 or in another computing system and/or storage system distinct from but coupled to or accessible by the computing system 800. The database(s) 808 can include one or more non-transitory computer-readable mediums for storing the data. In some implementations, the database(s) 808 may be incorporated with the memory 806 or may be distinct therefrom. In some implementations, the database(s) 808 may store data associated with a database management system (DBMS) operable on the computing system 800. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

It should be noted that the components described herein may be further delineated or changed without departing from the techniques described herein. For example, the processes described throughout this disclosure may be performed by fewer, additional, or different components.

It should be understood that the methods described herein are provided by way of example, and that variations and combinations of these methods, as well as other methods, are contemplated. For example, in some implementations, at least a portion of one or more of the methods represent various segments of one or more larger methods and may be concatenated or various steps of these methods may be combined to produce other methods which are encompassed by the present disclosure. Additionally, it should be understood that various operations in the methods are iterative, and thus repeated as many times as necessary generate the results described herein. Further the ordering of the operations in the methods is provided by way of example and it should be understood that various operations may occur earlier and/or later in the method without departing from the scope thereof.

In the above description, for purposes of explanation, numerous specific details are set forth in order to provide a thorough understanding of the present disclosure. However, it should be understood that the technology described herein can be practiced without these specific details in various cases. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms such as "processing," "computing," "calculating," "determining," "displaying," or the like, refer to the action and methods of a computer system that manipulates and transforms data represented as physical (electronic) quantities within the computer system's registers and memories into other data similarly represented as physical quantities within the computer system memories or registers or other such information storage, transmission or display devices.

A data processing system suitable for storing and/or executing program code, such as the computing system and/or devices discussed herein, may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices can be coupled to the system either directly or through intervening I/O controllers. The data processing system may include an apparatus may be specially constructed for the required purposes, or it may comprise a general-purpose computer selectively activated or reconfigured by a computer program stored in the computer.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects may not be mandatory or significant, and the mechanisms that implement the specification or its features may have different names, divisions, and/or formats.

Furthermore, the modules, routines, features, attributes, methodologies, and other aspects of the disclosure can be implemented as software, hardware, firmware, or any combination of the foregoing. The technology can also take the form of a computer program product accessible from a computer-usable or computer-readable medium providing program code for use by or in connection with a computer or any instruction execution system. Wherever a component, an example of which is a module or engine, of the specification is implemented as software, the component can be implemented as a standalone program, as part of a larger program, as a plurality of separate programs, as a statically or dynamically linked library, as a kernel loadable module, as firmware, as resident software, as microcode, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A method comprising:
determining, by one or more processors, a first carton identifier associated with a first carton for a first order;
assigning, by the one or more processors, a first transfer station to the first order and the first carton identifier based on scan data identifying a first item, the first order including the first item and a second item, the second item being assigned to the first transfer station;
transporting, by the one or more processors, the first item to the first transfer station using one or more first conveyors including diverting the first item to a corner of a consolidation area of the first transfer station, the corner of the consolidation area holding the first item and the second item simultaneously, the second item having been previously transported to the first transfer station using the one or more first conveyors;
transporting, by the one or more processors, the first carton to a carton-receiving area of the first transfer station including aligning the first carton at a position that is offset to a corner of the carton-receiving area, the corner of the consolidation area being located above the corner of the carton-receiving area in the first transfer station; and
transferring, by the one or more processors, the first item and the second item from the one or more first conveyors to the first carton associated with the first carton identifier using the first transfer station, including causing the first item and the second item to pass through an aperture at the corner of the consolidation area into the first carton.

2. The method of claim 1, further comprising:
transporting, by the one or more processors, the first carton associated with the first carton identifier to the first transfer station assigned to the first order using one or more second conveyors, the first carton being a shipping carton; and
responsive to determining that a defined condition has been satisfied, transporting, by the one or more processors, the first carton to a finalizing area using the one or more second conveyors, the defined condition including that the first item has been transferred into the first carton using the first transfer station.

3. The method of claim 1, further comprising:
receiving, by the one or more processors, scan data identifying the first item on the one or more first conveyors;
determining, by the one or more processors, the first order associated with the first item based on the scan data identifying the first item; and
assigning, by the one or more processors, the first transfer station to the first order and the first carton identifier based on the scan data identifying the first item.

4. The method of claim 1, further comprising:
selecting, by the one or more processors, a carton size of the first carton based on the first order;
associating, by the one or more processors in memory accessible to the one or more processors, the first carton identifier to the first carton with the first order; and
identifying, by the one or more processors, the first carton having the selected carton size based on the first carton identifier.

5. The method of claim 1, further comprising:
automatically transporting, by the one or more processors, the first carton from a case erector to the carton-receiving area of the first transfer station via one or more second conveyors based on the first carton identifier, the one or more second conveyors being located partially underneath the one or more first conveyors, the carton-receiving area being located below a transfer station consolidation area that receives one or more items; and
aligning the first carton to an edge under a door in the carton-receiving area of the first transfer station.

6. The method of claim 5, further comprising:
automatically transporting, by the one or more processors, the first carton from the carton-receiving area of the first transfer station to a finalizing area via the one or more second conveyors based on a defined condition, the defined condition including that the first item has been transferred into the first carton via the first transfer station.

7. The method of claim 1, further comprising:
receiving, by the one or more processors, scan data identifying a batch container containing a plurality of items;
identifying, by the one or more processors, a plurality of orders associated with the plurality of items based on the scan data identifying the batch container, the plurality of orders including the first order and the plurality of items including the first item;
providing, by the one or more processors, an instruction to one or more computing devices indicating to place the plurality of items on the one or more first conveyors;
assigning, by the one or more processors, a plurality of transfer stations to the plurality of orders; and
transporting, by the one or more processors, a plurality of cartons to the plurality of transfer stations using one or more second conveyors responsive to receiving the scan data identifying the batch container and based on the respective assigned transfer station for each of the plurality of orders, the plurality of cartons including the first carton.

8. The method of claim 1, further comprising:
determining, by the one or more processors, that the first item is at a loading point on the one or more first conveyors for the first transfer station; and
responsive to determining that the first item is at the loading point, diverting, by the one or more processors, the first item into the consolidation area of the first transfer station.

9. The method of claim 8, further comprising:
determining, by the one or more processors, that a set of items assigned to the first carton are in the consolidation area of the first transfer station; and
responsive to determining that all items assigned to the first carton are in the consolidation area of the first transfer station, transferring, by the one or more processors, the set of items from the consolidation area into the first carton using the first transfer station.

10. The method of claim 9, wherein:
transferring the items from the consolidation area into the first carton using the first transfer station includes opening a door of the first transfer station to allow the items to drop from the consolidation area into the first carton.

11. The method of claim 1, further comprising:

determining, by the one or more processors, that the first item has been transferred to the first carton using the first transfer station;

determining, by the one or more processors, an availability for the first carton on one or more second conveyors;

transferring, by the one or more processors, the first carton from the first transfer station to the one or more second conveyors at the availability for the first carton on the one or more second conveyors; and transporting, by the one or more processors, the first carton to a finalizing area using the one or more second conveyors.

12. A system, comprising:

a transfer station that transfers a first item and a second item into a shipping carton, the transfer station including:

a consolidation area that holds the first item simultaneously with the second item at a corner of the transfer station, one or more structures that divert the first item and the second item toward the corner of the consolidation area, an aperture offset toward the corner of the consolidation area, a carton-receiving area that receives the shipping carton at a position below the corner of the consolidation area, and a door that causes the first item and the second item to move from the corner of the consolidation area to the shipping carton when the door opens;

one or more first conveyors that convey the first item and the second item between an item induction point and the transfer station;

one or more second conveyors that convey the shipping carton between a carton induction point and the transfer station;

one or more scanners that scan the first item and the second item in an order; and one or more processors communicatively coupled with the one or more scanners, the one or more first conveyors, and the one or more second conveyors, the one or more processors using the scan of the first item and the scan of the second item to assign the first item and the second item to the transfer station, transporting the first item into the consolidation area, transporting the second item into the consolidation area, and causing the door to open to allow the first item and the second item to pass through the aperture and into the shipping carton.

13. The system of claim 12, wherein the system further comprises:

a plurality of transfer stations located along a length of the one or more first conveyors and the one or more second conveyors.

14. The system of claim 12, wherein:

the one or more first conveyors pass through a scan tunnel in advance of the transfer station along a direction of movement of the one or more first conveyors, the one or more scanners pointing toward the one or more first conveyors when the one or more scanners are housed in the scan tunnel.

15. The system of claim 12, wherein:

the transfer station includes the consolidation area proximate to the one or more first conveyors and the carton-receiving area proximate to the one or more second conveyors.

16. The system of claim 15, wherein:

the transfer station includes the door at the consolidation area and coupled with an electrical actuator, the electrical actuator retaining the door in a closed position when the first item and the second item is in the consolidation area and opening the door in response to a signal from the one or more processors;

the transfer station includes a guide member adapted to guide the first item and the second item into the shipping carton during transfer of the first item and the second item into the shipping carton, the door allowing the first item and the second item to pass from the consolidation area into the shipping carton when the door is in an open position; and the consolidation area is located at a higher elevation than the carton-receiving area.

17. The system of claim 12, wherein:

the one or more second conveyors pass partially underneath and parallel with the one or more first conveyors at a point where the one or more first conveyors are proximate to the transfer station.

18. The system of claim 12, further comprising:

a diverter mechanism adapted to transfer the first item from the one or more first conveyors to the consolidation area of the transfer station, the diverter mechanism including a conveyor belt and a surface coupled to the conveyor belt, the conveyor belt translating the surface perpendicular to a direction of movement of the one or more first conveyors, the surface adapted to contact the first item on the one or more first conveyors and move the first item into the transfer station.

19. The system of claim 12, wherein:

the one or more second conveyors convey the shipping carton with the first item and the second item inside of the shipping carton from the transfer station to a finalizing area.

20. The system of claim 12, wherein the one or more processors are adapted to perform operations comprising:

receiving scan data from the one or more scanners;

assigning the transfer station to the first item based on the received scan data, the system including a plurality of transfer stations adapted to transfer items from the one or more first conveyors to the one or more second conveyors;

transporting the first item to the transfer station using the one or more first conveyors based on the scan data;

diverting the first item into the consolidation area of the transfer station using a diverter mechanism;

transporting the shipping carton to the carton-receiving area of the transfer station using the one or more second conveyors;

transferring the first item from the consolidation area into the shipping carton in the carton-receiving area using the transfer station; and transporting the shipping carton to a finalizing area using the one or more second conveyors.

21. An automated item-sorting system, comprising:

means for receiving scan data identifying a first item on one or more first conveyors;

means for determining an order associated with the first item based on the scan data identifying the first item, the order being associated with the first item and a second item;

means for determining a carton identifier associated with a carton based on the order;

means for assigning a transfer station to the order and the carton identifier based on the scan data identifying the first item;

means for transporting the first item and the second item to the transfer station using the one or more first conveyors;

means for diverting the first item and the second item to a corner of a consolidation area of the transfer station, the corner of the consolidation area holding the first item and the second item simultaneously, the second item having been transported to the consolidation area using the one or more first conveyors, the carton being positioned in a carton-receiving area of the transfer station and below an aperture at the corner of the consolidation area; and means for transferring the first item and the second item from the one or more first conveyors to the carton associated with the carton identifier using the transfer station including causing the first item and the second item to pass through the aperture from the consolidation area to the carton.

* * * * *